(12) United States Patent
Brelay et al.

(10) Patent No.: US 8,543,724 B2
(45) Date of Patent: Sep. 24, 2013

(54) METHODS AND APPARATUSES FOR A PROJECTED PVR EXPERIENCE

(75) Inventors: Hervé Brelay, San Jose, CA (US); Yann Poupet, Bouches du Rhone (FR); Luc Vantalon, Sunnyvale, CA (US)

(73) Assignee: Digital Keystone, Inc., Mountain View, CA (US)

( * ) Notice: Subject to any disclaimer, the term of this patent is extended or adjusted under 35 U.S.C. 154(b) by 62 days.

(21) Appl. No.: 12/772,064

(22) Filed: Apr. 30, 2010

(65) Prior Publication Data
US 2011/0271092 A1     Nov. 3, 2011

(51) Int. Cl.
*G06F 15/16*     (2006.01)

(52) U.S. Cl.
USPC ........... 709/233; 709/229; 709/231; 380/201; 380/210

(58) Field of Classification Search
USPC .................. 709/229, 231, 233; 380/201, 210
See application file for complete search history.

(56) References Cited

U.S. PATENT DOCUMENTS

| | | | |
|---|---|---|---|
| 6,871,006 B1 | 3/2005 | Oguz et al. | |
| 6,873,621 B2 * | 3/2005 | Kamoi et al. | 370/395.61 |
| 7,058,179 B1 * | 6/2006 | Maruo et al. | 380/211 |
| 7,181,131 B2 * | 2/2007 | Lin et al. | 386/206 |
| 7,471,834 B2 | 12/2008 | Sull et al. | |
| 7,509,687 B2 * | 3/2009 | Ofek et al. | 726/30 |
| 7,596,298 B2 * | 9/2009 | Kelly et al. | 386/343 |
| 7,734,800 B2 * | 6/2010 | Gupta et al. | 709/231 |
| 7,873,104 B2 * | 1/2011 | Kim et al. | 375/240.02 |
| 8,282,476 B2 * | 10/2012 | Walter | 463/29 |
| 2003/0108205 A1 * | 6/2003 | Joyner et al. | 380/277 |
| 2003/0208767 A1 | 11/2003 | Williamson et al. | |
| 2004/0151315 A1 * | 8/2004 | Kim | 380/241 |
| 2005/0074225 A1 | 4/2005 | Lin et al. | |

(Continued)

FOREIGN PATENT DOCUMENTS

| | | |
|---|---|---|
| EP | 0 812 112 A2 | 12/1997 |
| WO | WO 2006/083609 A2 | 8/2006 |
| WO | WO 2007/072252 A2 | 6/2007 |
| WO | WO 2008/084876 A1 | 7/2008 |

OTHER PUBLICATIONS

MSF Servies Working Group: "MSF Whitepaper on Time-Shift, Place-Shift, and Deivce-Shift (Triple-Shift) IPTV Services" Jan. 21, 2010, XP055015776, retrieved from internet on Jan. 5, 2010 at http://www.msforum.org/techinfo/reports/MSF-TR-SERVICES-001-FINAL.pdf, pp. 22 pgs.

*Primary Examiner* — Wing F Chan
*Assistant Examiner* — Tesfay Yohannes
(74) *Attorney, Agent, or Firm* — Blakely, Sokoloff, Taylor & Zafman LLP

(57) ABSTRACT

Exemplary embodiments of methods and apparatuses to project personal video recorder ("PVR") trick mode operations over a network are described. A first content stream may be at a first speed. A request to access the first content stream at a second speed can be received. A second content stream can be generated based on a second speed. The second content stream can be send over a network to be rendered at the first speed by a client device. One or more anchor frames in the first content stream are selected. The second content stream is generated based on the one or more anchor frames. One or more dummy frames can be inserted into the second content stream. Indexing information can be generated to create a second content stream to send over the network.

31 Claims, 16 Drawing Sheets

(56) References Cited

U.S. PATENT DOCUMENTS

| | | |
|---|---|---|
| 2005/0262529 A1 | 11/2005 | Neogi et al. |
| 2005/0271353 A1* | 12/2005 | Kelly et al. .................... 386/46 |
| 2006/0029228 A1* | 2/2006 | Lagrange et al. ............. 380/201 |
| 2006/0093318 A1* | 5/2006 | Cohen et al. ................... 386/68 |
| 2006/0133610 A1* | 6/2006 | Maruo et al. ................. 380/210 |
| 2006/0146780 A1 | 7/2006 | Paves |
| 2007/0166000 A1 | 7/2007 | Nallur et al. |
| 2007/0286420 A1* | 12/2007 | MacLean et al. ............. 380/201 |
| 2008/0075437 A1 | 3/2008 | Hamada et al. |
| 2008/0168294 A1 | 7/2008 | Batson et al. |
| 2008/0270308 A1* | 10/2008 | Peterka et al. ................. 705/51 |
| 2008/0273858 A1* | 11/2008 | Wald et al. ..................... 386/68 |
| 2009/0015701 A1 | 1/2009 | Noh |
| 2009/0080533 A1 | 3/2009 | Folta et al. |
| 2009/0158326 A1 | 6/2009 | Hunt et al. |
| 2009/0190670 A1* | 7/2009 | Lin et al. .................. 375/240.27 |
| 2009/0249393 A1* | 10/2009 | Shelton et al. .................. 725/39 |
| 2009/0287837 A1* | 11/2009 | Felsher ......................... 709/229 |
| 2010/0198980 A1 | 8/2010 | Astrom et al. |
| 2010/0235285 A1* | 9/2010 | Hoffberg ........................ 705/75 |
| 2010/0325657 A1* | 12/2010 | Sellers et al. ................... 725/32 |
| 2011/0078750 A1 | 3/2011 | Tam et al. |
| 2011/0080940 A1 | 4/2011 | Bocharov et al. |
| 2011/0119394 A1 | 5/2011 | Wang et al. |

\* cited by examiner

METHODS AND APPARATUSES FOR A PROJECTED PVR EXPERIENCE

CROSS-REFERENCE TO RELATED APPLICATIONS

The present application is related to U.S. patent application Ser. No. 12/772,066, entitled "METHODS AND APPARATUSES FOR A PROJECTED PVR EXPERIENCE", filed Apr. 30, 2010, and to U.S. patent application Ser. No. 12/772,070 entitled "METHODS AND APPARATUSES FOR A PROJECTED PVR EXPERIENCE", filed Apr. 30, 2010, which are both hereby incorporated by reference.

COPYRIGHT NOTICES

A portion of the disclosure of this patent document contains material which is subject to copyright protection. The owners of the copyrights, including the assignee of the present invention, hereby reserve their rights, including copyright, in these materials. The copyright owners have no objection to the facsimile reproduction by anyone of the patent document or the patent disclosure, as it appears in the Patent and Trademark Office patent file or records, but otherwise reserve all copyright rights whatsoever. COPYRIGHT © 2010 DIGITAL KEYSTONE.

FIELD

At least some embodiments of the present invention relate generally to controlling the streaming of multimedia content, and more particularly to projecting streaming effects on unmanaged player over a network.

BACKGROUND

Typically, a personal video recorder ("PVR") refers to a device that records video in a digital form to a disk drive or other memory medium within a device. The PVR may include a set-top box, portable media player ("PMP") and computer software, which enables video capture and playback to and from disk. In a typical PVR configuration (e.g., TiVo), the player and storage functions are contained within the same device. This eliminates the ability to reach remote discrete players.

In a network PVR configuration provided, for example, by Cablevision, the player and storage functions are implemented on discrete networked devices, using private protocols for trick mode operations.

FIG. 1 shows a typical network PVR configuration. A network PVR configuration 100 has a network 101 (e.g., server, gateway) and clients 103 and 104. Network 101 may have a storage 102 for storing a multimedia content. Clients 103 and 104 may have a set top box and a player (not shown) to receive and play the multimedia content.

Generally, trick modes are user operations that allow random access to the multimedia content. Scan trick mode operations, e.g., simulating the fast forward and reverse scanning action of the video tape ("Scanning"), may be implemented through interpretation of the navigation information ("indexing information") associated with the streaming media content by the multimedia player at the client. The navigation information may be in various multimedia standards and specifications that define the syntax and carriage of indexing information, e.g., the DVD Forum, the Blu-ray Disc Association, DivX specifications for DivX content, Microsoft Streaming Format for ASF container, and others.

In the existing network PVR configurations, a scan trick mode operation is performed by both network server 101 and client 103. For example, to perform 16× scan at client 103, the multimedia content may be decimated at network server 101 and stitched at client 103. Generally, decimation may refer to a technique of reducing the number of samples of a time dependent signal that represents the streaming multimedia content.

Stitching may refer to a technique of combining the samples of time dependent signal that represents the streaming multimedia content. Typically, when a trick mode operation is performed, the client implements a video sample selection and combination method so that no visual artifacts are presented from an incoming decimated stream.

The typical scan trick mode operation relies both on the capability of the content to be streamed faster than its nominal 1× playback rate from the network server and on interpretation of metadata by a player rendering the multimedia content at the client. That is, in the existing network PVR configurations a trick mode operation depends on a player at a client.

The player at the client is required by the network server to perform certain actions (e.g., stitching) for the trick mode to occur. If the player at the client (e.g., client 104) cannot recognize the actions that are required by the network server to perform, the trick mode operation cannot be accomplished. As a result, existing network PVR configurations eliminate the ability to work with retail players.

Further, in some existing network PVR configurations, multiple encoded versions of each asset are created in advance for each potential scan speed and streamed on demand. However this solution may not apply to broadcast content as it will take large amount of bandwidth and disk space to distribute and store multiple encoded versions of each asset for each potential scan speed.

SUMMARY

Exemplary embodiments of methods and apparatuses to project personal video recorder ("PVR") trick mode operations over a network are described. In at least some embodiments, the first content stream (e.g., incoming content stream) is received at a first speed. A request to access the first content stream at a second speed can be received. It can be decided whether to generate a second content stream or re-use the first content stream based on the second speed. A second content stream (e.g., a projected scan stream) can be generated based on the second speed. The second content stream can be sent over a network to render at the first speed at a client device. The second content stream can be encrypted to send over the network.

In at least some embodiments, the second content stream is equivalent to the first content stream, if the second speed is less or equal to the first speed.

In at least some embodiments, anchor frames are determined from the first content stream. One or more dummy frames can be inserted between at least a portion of the anchor frames to generate the second content stream. In at least some embodiments, indexing information associated with the anchor frames in the first content stream is generated. In at least some embodiments, the first content stream is decrypted to generate the indexing information.

In at least some embodiments, indexing information associated with anchor frames in the first content stream is received over the network. In at least some embodiments, the first content stream is encrypted, and when the indexing information is received over the network, the second content stream is generated without decrypting the encrypted first content stream.

In at least some embodiments, one or more anchor frames in a first content stream associated with a first clock are selected. The first clock can be accelerated to provide a second clock. A second content stream associated with the second clock is generated based on the one or more anchor frames. One or more dummy frames can be inserted into the second content stream based on the second clock. A presentation time of the one or more current anchor frames in the second content stream can be adjusted.

In at least some embodiments, one or more anchor frames in a first content stream are detected at a first speed. Indexing information associated with the one or more anchor frames can be generated to create a second content stream at a second speed to send over the network. In at least some embodiments, the indexing information is multiplexed with the first content stream. The indexing information can be stored in a first file in a memory.

The indexing information may include a position of an anchor frame in the first content stream, a size of the anchor frame, an original timestamp of the anchor frame, a bit rate of a content segment the anchor frame belongs to, a resolution of the anchor frame, a frame rate of the content segment the anchor frame belongs to, a digital rights management ("DRM") key identifier, or any combination thereof. One or more anchor frames detected in the first content stream can be stored in a second file in the memory.

In at least some embodiments, a first anchor frame is detected. The first anchor frame is output to generate a projected content stream. A first clock value can be increased at the second speed to provide a second clock value for the second anchor frame to be inserted. The second anchor frame can be identified by indexing information associated with an incoming content stream. Dummy frames may be inserted between the first and second clock values to generate the adequate frame rate of the second speed. A determination is made whether a second anchor frame can be inserted into the projected content stream based on the second clock value.

If the second anchor frame can be inserted, a determination is made whether space in the output channel is available. If space is available, the second anchor frame is output to be inserted into the projected content stream. If the second anchor frame is inserted, an indexing information is updated based on the inserted anchor frame.

A channel bit rate usage can be updated based on a size of the inserted second anchor frame. A presentation timestamp of the inserted second anchor frame can be adjusted based on the second clock value. If the second anchor frame is not inserted, one dummy frame can be released instead.

Other features of the present invention will be apparent from the accompanying drawings and from the detailed description which follows.

BRIEF DESCRIPTION OF DRAWINGS

The present invention is illustrated by way of example and not limitation in the figures of the accompanying drawings in which like references indicate similar elements.

DETAILED DESCRIPTION

Figure 1:
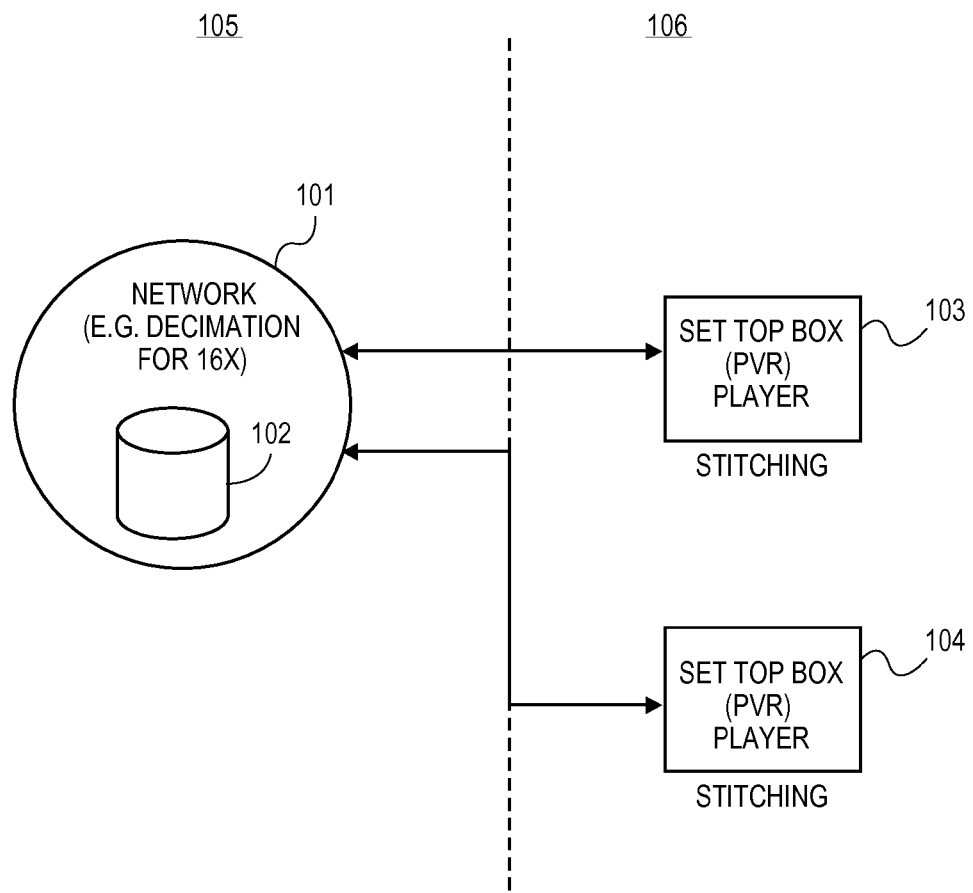
FIG. 1 shows a typical network PVR configuration.

The embodiments of the invention will be described with references to numerous details set forth below, and the accompanying drawings will illustrate the embodiments of the invention. The following description and drawings are illustrative of the embodiments of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "at least some embodiments", "another embodiment", or "an embodiment" means that a particular feature, structure, or characteristic described in connection with the embodiment is included in at least at least some embodiments of the present invention. Thus, the appearance of the phrases "in at least some embodiments" or "in an embodiment" in various places throughout the specification are not necessarily all referring to the same embodiment. Furthermore, the particular features, structures, or characteristics may be combined in any suitable manner in one or more embodiments.

Exemplary embodiments of methods and apparatuses to project trick mode operations (e.g., pause, jump, slow motion and scan) on a multimedia content from a source (e.g., a network gateway, server, bridge) to any client (e.g., subscriber player device) are described. The source and the client device can be connected through a standard IP network. In at least some embodiments, a trick mode operation (e.g., pause, jump, slow motion and scan) is enabled from the network gateway without any support from a player at the client. In at least some embodiments, pause and slow motion trick modes are performed at a player device, as set forth in further detail below.

Further, exemplary embodiments of methods and apparatuses to provide content indexing (generation, transmission and storage), customized content generation (visual effect of fast forward/reverse), and streaming control in multiple modes of gateway and player operations are described. In at least some embodiments, the content is pre-indexed in an operator network. In at least some embodiments, the content is indexed in a gateway, as set forth in further detail below. In at least some embodiments, the content is decrypted and re-encrypted in a gateway for a player, as set forth in further detail below.

In at least some embodiments, the content is passed-through encrypted to the player. The multimedia content can be streamed in compliance with the HTTP Live Streaming protocol, IIS ("Internet Information Services") Smooth Streaming protocol, HTTP Dynamic Streaming protocol, or any other streaming protocol.

In at least some embodiments, exemplary embodiments of methods and apparatuses set forth herein are incorporated into a Digital Keystone Maelstrom™ Content Service (MCS) component that intends to bridge premium broadcast content with open media devices.

Figure 2:
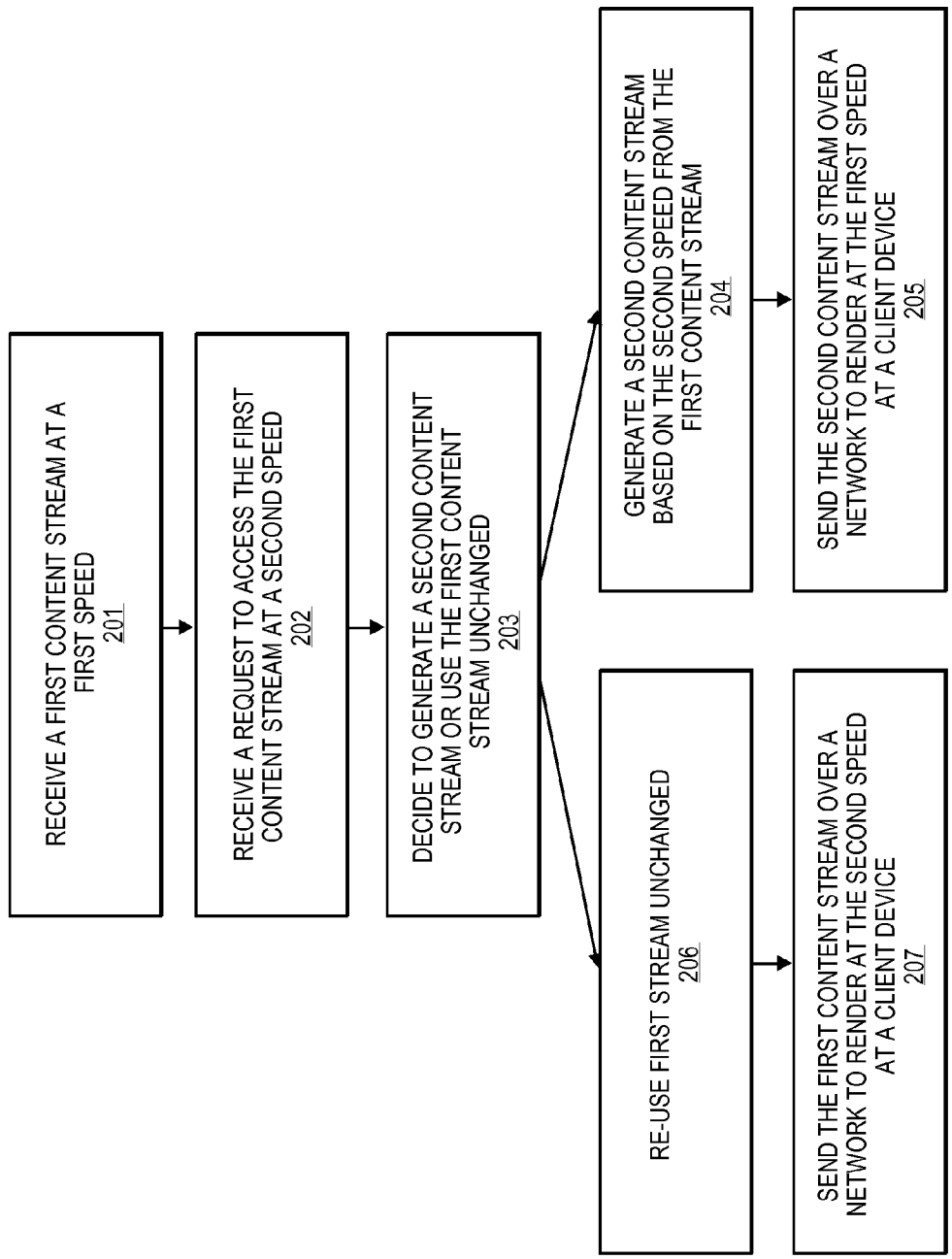
FIG. 2 shows a flowchart of an exemplary embodiment of a method to project trick mode operations over a network.

FIG. 2 shows a flowchart of an exemplary embodiment of a method to distribute ("project") trick mode operations over a network to different players. Method 200 begins with operation 201 that involves receiving a first content stream at a first speed. The first content stream may include an incoming multimedia content stream. The first content stream may include video, audio, data, or any combination thereof. The first speed may be a speed at which the first content stream can be rendered.

Figure 3:
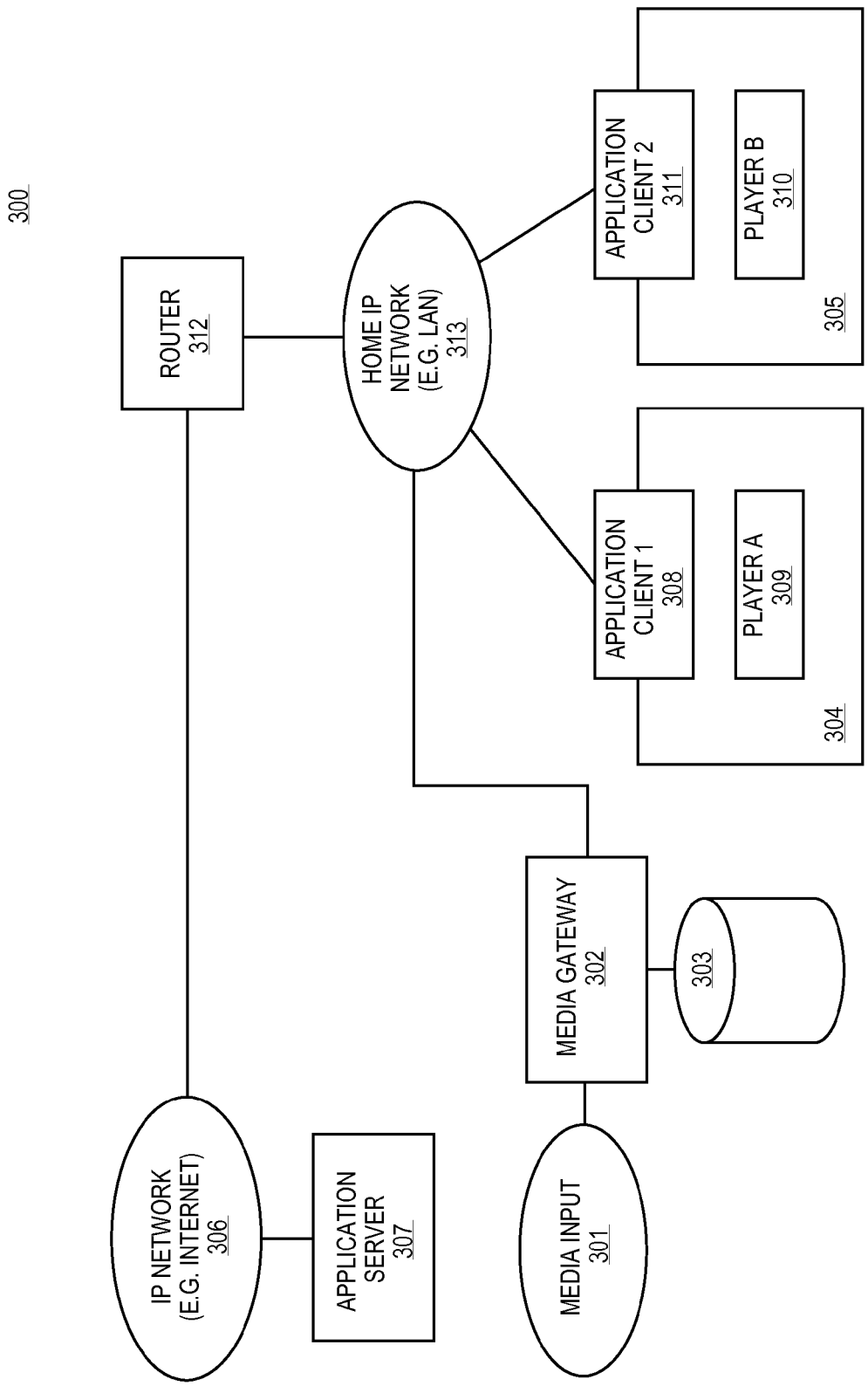
FIG. 3 shows a block diagram of an exemplary embodiment of a gateway PVR to project trick mode operations to any player.

FIG. 3 shows a block diagram of an exemplary embodiment of a gateway PVR 300 to project trick mode operations to any player. As shown in FIG. 3, the gateway PVR 300 includes a media input 301, possibly Cable, Satellite, Terrestrial or Internet, that provides an incoming multimedia content stream to a media gateway 302. As shown in FIG. 3, media gateway 302 can be coupled to a client device 304, to a client device 305, and to any other client device (not shown) over an IP network 313 (e.g., a local home network). In at least some embodiments, IP network 313 is connected to an IP network 306 (e.g., Internet) through a router device 312. As shown in FIG. 3, media gateway 302 is coupled to an application server 307 via IP network 313, router device 312 and IP Network 306. Client device 304 may include a player A 309 and an application program 308. Client device 305 may include a player B 310 and an application program 311. Each of the client devices 304 and 305 may be a set top box, a personal computer, or any other processing device. Player A 309 can be different than player B 310. The player at the client may be a software plug-in, an hardware decoder or the combination of both, for example, a WINDOWS media player, a FLASH media player, an IPOD, a QUICKTIME media player, a REALTIME media player, or any other video and/or audio player. Each of the application program Client 1 308 and application program Client 2 311 may be coupled through media gateway 302 to an IP network 306 (e.g., Internet) coupled to an application server 307. Media gateway 302 can be coupled to storage 303 to store a multimedia content, as shown in FIG. 3.

In at least some embodiments, each of the application programs 308 and 311 includes a graphical user interface, for example, to watch and/or interact with the incoming multimedia content rendered by the player. Application program Client 1 308 and/or application program Client 2 311 may include e.g., a web browser, an email application. Application server 307 can generate a customized user interface to interact with multimedia content from the user's gateway, and specific to each player characteristics.

In at least some embodiments, application server 307 is configured to present the content to a user, for example, to find what to watch and to start playing the content. In at least some embodiments, application server 307 is further configured to receive streaming control commands from a user, e.g., "play", "fast forward", "fast backward", "jump", "pause", and the like. In at least some embodiments, application server 307 is further configured to deal with the remote control keys and to decide if that key needs to be sent to the player locally or needs to be sent to the gateway.

In at least some embodiments, a user interface customized for each client is built using resources of the IP network 306 (e.g., Internet). In at least some embodiments, IP network 306 includes application server 307. In at least some embodiments, media gateway 302 includes application server 307. Application program 308 can control communication between the media gateway 302 and client 304 (session A). Application program 311 can control communication between the media gateway 302 and client 305 (session B). A multimedia content from storage 303 can be provided to client 304 in a format that is compatible to player 309. A multimedia content from storage 303 can be provided to client 305 in a format that is compatible to player 310.

The incoming multimedia content stream can be received by the media gateway 302 from a cable or satellite input 301. In at least some embodiments, the incoming multimedia content stream is provided by the gateway un-altered to a client and rendered at the first (e.g., nominal 1×) speed by a player of a client. Rendering the multimedia content at a nominal speed by a player can be referred as a normal playback.

Referring back to FIG. 2, method 200 continues operation 202 involving receiving a request to access the first content stream at a second speed.

Referring back to FIG. 3, a request to access the first content stream at a second speed can be received by the media gateway 302 from client 304, client 305, or any other client. In at least some embodiments, the incoming multimedia content stream may be provided by the media gateway 302 un-altered to render at the client at a second speed that is slower than the first speed. Rendering the multimedia content at a speed that is slower than the nominal 1× speed by a player can be referred as a slow playback.

Referring back to FIG. 2, method 200 continues with operation 203 that involves deciding whether to generate a second content stream or use the first content stream unchanged. If it is decided that a second content stream is generated, method 200 continues at operation 204 that involves generating a second content stream from the first content stream based on the second speed. In at least some embodiments, the second content stream is generated from the first content stream in real time, on-the-fly.

In at least some embodiments, the incoming multimedia content stream can be altered by the media gateway 302 to give the impression of fast forward or reverse motion to the client while rendered at the nominal 1× speed by the player at the client. Rendering the incoming multimedia content that has been altered by the gateway, at the nominal 1× speed at the client can be referred as a projected scan playback. That is, the projected scan playback refers to creating a perception of PVR experience associated with a trick mode speed (e.g., 2×, 3×, etc.) while rendering the incoming content stream at a normal 1× speed at the client.

In at least some embodiments, the media gateway 302 is configured to generate a projected content stream having a trick mode for each client independent of the player configuration, as set forth in further detail below. In at least some embodiments, the multimedia content stream is serviced to different clients at different speeds. The mechanism of generating the trick mode is independent of the player and it is done in such a way that the content is created to be smooth for the player. In at least some embodiments, the media gateway 302 performs both decimation and stitching of the incoming multimedia content and sends decimated and stitched multimedia content to a player. That is, the trick mode operation including decimation and stitching of the samples of the time varying signal representing a multimedia content is performed only at one end of a gateway PVR, e.g., at a network gateway. A player receiving content from a gateway PVR (e.g., at a client) does not need to perform trick mode operations on the multimedia content. There is no longer any restriction on a player configuration. A gateway PVR can enable trick mode operations on the streaming multimedia content independent and without any support from the player.

In at least some embodiments, the first multimedia content stream is encrypted, and the second content stream is generated without decrypting the encrypted first content stream. In at least some embodiments, the first content multimedia content stream, the second multimedia content stream, or both are in compliance with a Hypertext Transfer Protocol ("HTTP") Live Streaming protocol, IIS Smooth Streaming protocol, HTTP Dynamic Streaming protocol, or any other streaming protocol.

Generating the second content stream can include determining anchor frames from the first content stream; and inserting one or more dummy frames between at least a portion of the anchor frames, as described in further detail below. Generally, an anchor frame is a frame of the streaming multimedia content which can be decoded without any reference to external prediction. In at least some embodiments, the anchor frame is a self-contained video frame having a complete image stored in the data stream. In at least some embodiments, the anchor frame is a static picture, and does not contain temporal information. The anchor frame does not need other frames for decoding. The anchor frame may include all the codec headers (for example, an Intra frame ("I-frame") with Sequence and Picture headers as in Moving Picture Experts Group ("MPEG")-2 Video; a IDR ("Instantaneous Decoding Refresh") picture, Intra frame or slice with Sequence and Picture Parameter Sets as in MPEG-4 AVC (Part10)). In at least some embodiments, a dummy frame is a Dummy-P video frame. Typically, a P-frame ("Predictive frame") in MPEG-2 or SP-slice ("Switching Predictive Slice") in MPEG-4 AVC, which holds only the changes in the image from a previous reference frame or slice. For example, in a scene where a car moves across a stationary background, only the car's movements can be encoded in subsequent video frames (Predictive frames) from an initial reference frame that includes the stationary background (IDR picture, Intra frame or slice). The encoder does not need to store the unchanging background pixels in the P-frame, so a memory space, processing power and memory bandwidth are saved. The Dummy-P video frame is a bit pattern typically defining a predictive frame (P frame or SP slice) reconstructed in the intended video codec syntax as identical to its reference frame. Because it is intended to completely reconstruct a reference frame with no difference, its syntax does not depend on any pixel data or statistics from any video frame. It usually depends solely on the reference picture's horizontal and vertical resolution.

Method 200 continues with operation 205 that involves sending the second content stream generated from the first content stream over a network to render at the first (e.g., nominal 1x) speed at a client device. If it is decided at operation 203 that a second content stream is not generated, method 200 continues with operation 206 that involves re-using the first content stream unchanged. In this case, at operation 207 the first content stream is sent unchanged over a network to render at the second speed at a client device. In at least some embodiments, the second content stream is not generated, and the first content stream is sent unaltered over the network, if the second speed is less or equal to the first speed, as set forth in further detail below.

Referring back to FIG. 3, the second content stream having the trick mode can be send from the media gateway 302 to player 309 based on the content residing in storage 303. In at least some embodiments, the second content stream having the trick mode at Nx speed, where N is any number greater than one can be send to be rendered at 1x speed by a player at a client.

Figure 4:
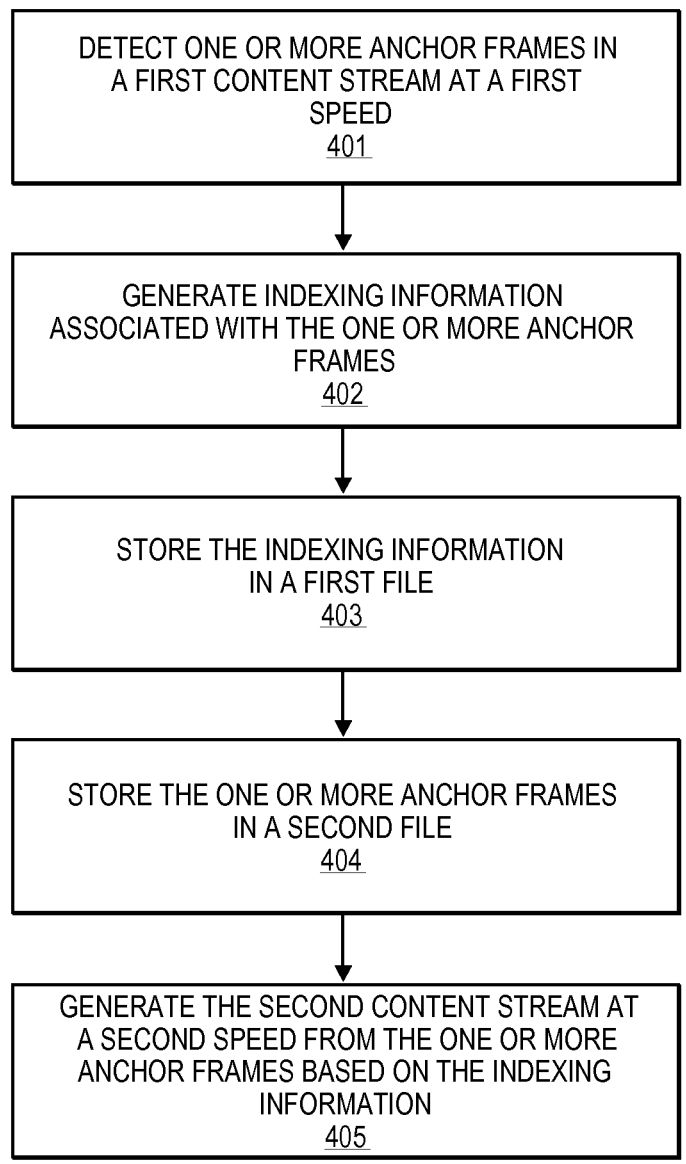
FIG. 4 shows a flowchart of an exemplary embodiment of a method to generate a multimedia content stream projecting a trick mode.

FIG. 4 shows a flowchart of an exemplary embodiment of a method to generate a multimedia content stream having a trick mode. Method 400 begins with operation 401 including detecting one or more anchor frames in a first multimedia content stream associated with a first speed. The first speed may be, for example, a nominal (1x) speed at which the un-altered multimedia content is rendered at a client during a normal playback. In at least some embodiments, the first multimedia content stream is pre-indexed in a network before being transmitted to the media gateway 302. Pre-indexing the multimedia content stream generates indexing information for one or more anchor frames.

The indexing information can be the position of an anchor frame in the multimedia content stream, the size of the anchor frame, the original timestamp of the anchor frame, the bit rate of a content segment the anchor frame belongs to, the resolution of the anchor frame, the frame rate of the content segment the anchor frame belongs to, a digital rights management (DRM) key identifier, or any combination thereof. In at least some embodiments, the first content stream is transmitted with the indexing information. In another embodiment, the indexing information can be retrieved by the gateway over a network after it has received the first content stream and multiplexed before storage.

In yet another embodiment, at operation 402, indexing information associated with the one or more anchor frames is generated. The indexing information can be generated at the media gateway 302. In at least some embodiments, encrypted anchor frames in the incoming content stream are decrypted to generate the indexing information. At operation 403 the indexing information is stored in a first file in a memory. For example, the indexing information can be stored in a first file in storage 303 shown in FIG. 3.

In at least some embodiments, the indexing information maps an anchor frame to its position in the incoming content stream. At operation 404 the one or more anchor frames detected in the first multimedia content stream are stored in a second file in a memory. For example, the one or more anchor frames can be stored in a second file in storage 303 shown in FIG. 3.

At operation 405, the second content stream at a second speed is generated from the one or more anchor frames based on the indexing information. In at least some embodiments, the anchor frames are encrypted. In at least some embodiments, one or more dummy frames are inserted between at least a portion of the anchor frames, as set forth in further detail below. In at least some embodiments, the anchor frames are decrypted by the gateway, and then re-encrypted along with the inserted dummy frames to be sent to a player. In at least some embodiments, the anchor frames are not decrypted by the gateway, and the inserted dummy frames are sent to a player in the clear. In at least some embodiments, a presentation time of the frames in the second content stream is adjusted, as set forth in further detail below.

Figure 5:
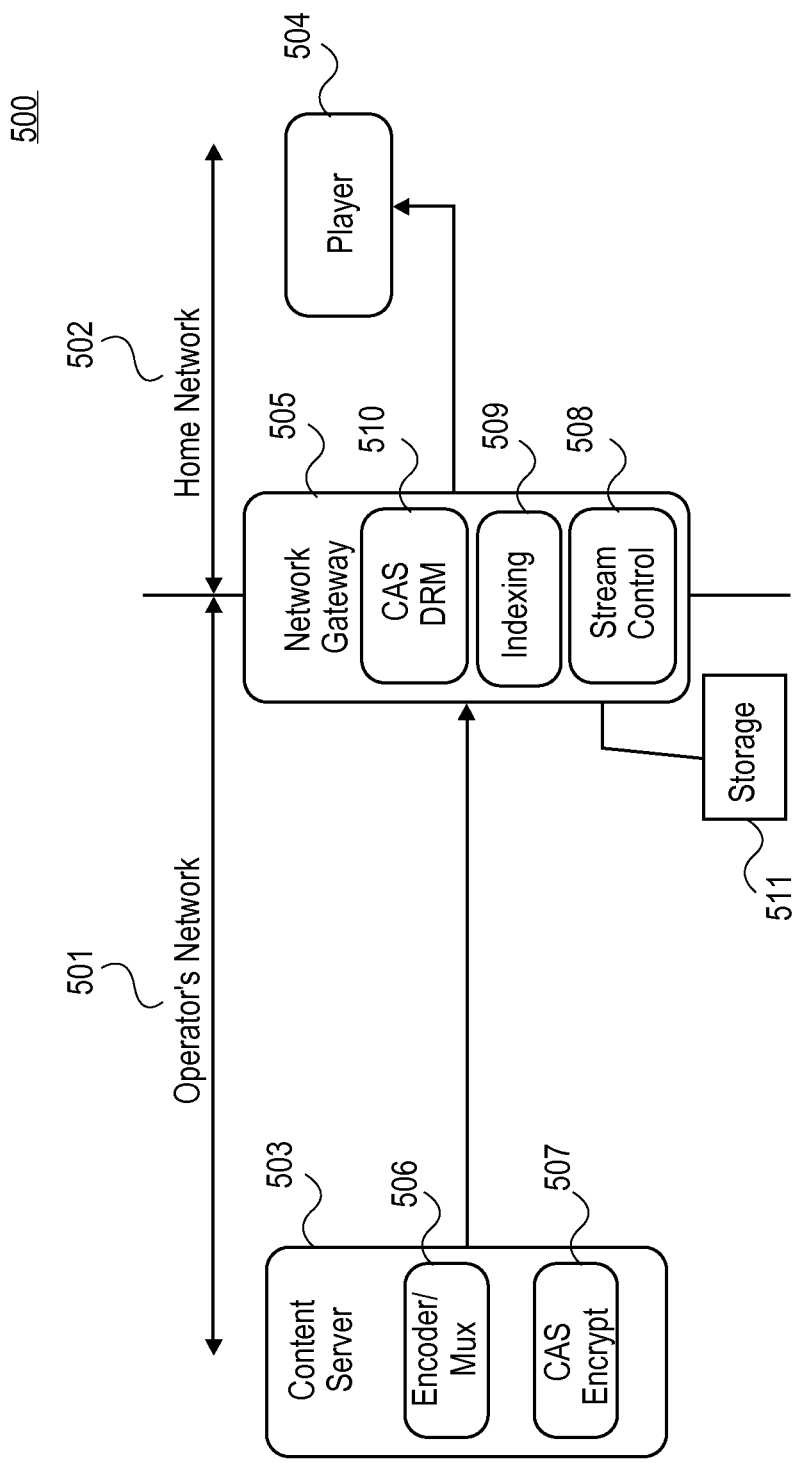
FIG. 5 shows a block diagram of an exemplary embodiment of a network for indirect delivery of conditional access ("CA")-encrypted content.

In at least some embodiments, the first content stream is decrypted to obtain the indexing information, and the second content stream is encrypted to send over the network. In at least some embodiments, the first multimedia content stream is received encrypted, and the second content stream is generated without decrypting the encrypted first content stream. In at least some embodiments, the first content multimedia content stream, the second multimedia content stream, or both are in compliance with a Hypertext Transfer Protocol ("HTTP") Live Streaming protocol, IIS Smooth Streaming protocol, HTTP Dynamic Streaming protocol, or any other streaming protocol FIG. 5 shows a block diagram of an exemplary embodiment of a network for content indexing of a conditional access ("CA") encrypted broadcast. A network 500 includes an operator's network 501 and a home network 502. The operator's network 501 includes a content server 503. Content server 503 has an encoder/multiplexer ("Encoder/Mux") 506 and a conditional access system ("CAS") encrypter 507. Home network 502 includes one or more players, e.g., a player 504. As shown in FIG. 5, the premium content is delivered to a network gateway 505. Network gateway 505 includes a CAS DRM bridge, an indexing logic 509, and a stream control logic 508. As shown in FIG. 5, storage 511 can be coupled and/or incorporated into the network gateway 505. In at least some embodiments, gateway 505 is configured to perform content indexing (e.g., identify random access points in the incoming multimedia content stream). Generally, the content indexing location depends on how the operator provisions the network gateways devices.

As shown in FIG. 5, the premium content is delivered to gateway 505, protected by a Conditional Access System (CAS). The CA protection is removed in the gateway 505, content is indexed and then DRM-encrypted for storage security in a storage 511 and further distribution to home players and network storage devices. Additional media format conversions may be required for player compatibility.

Figure 6:
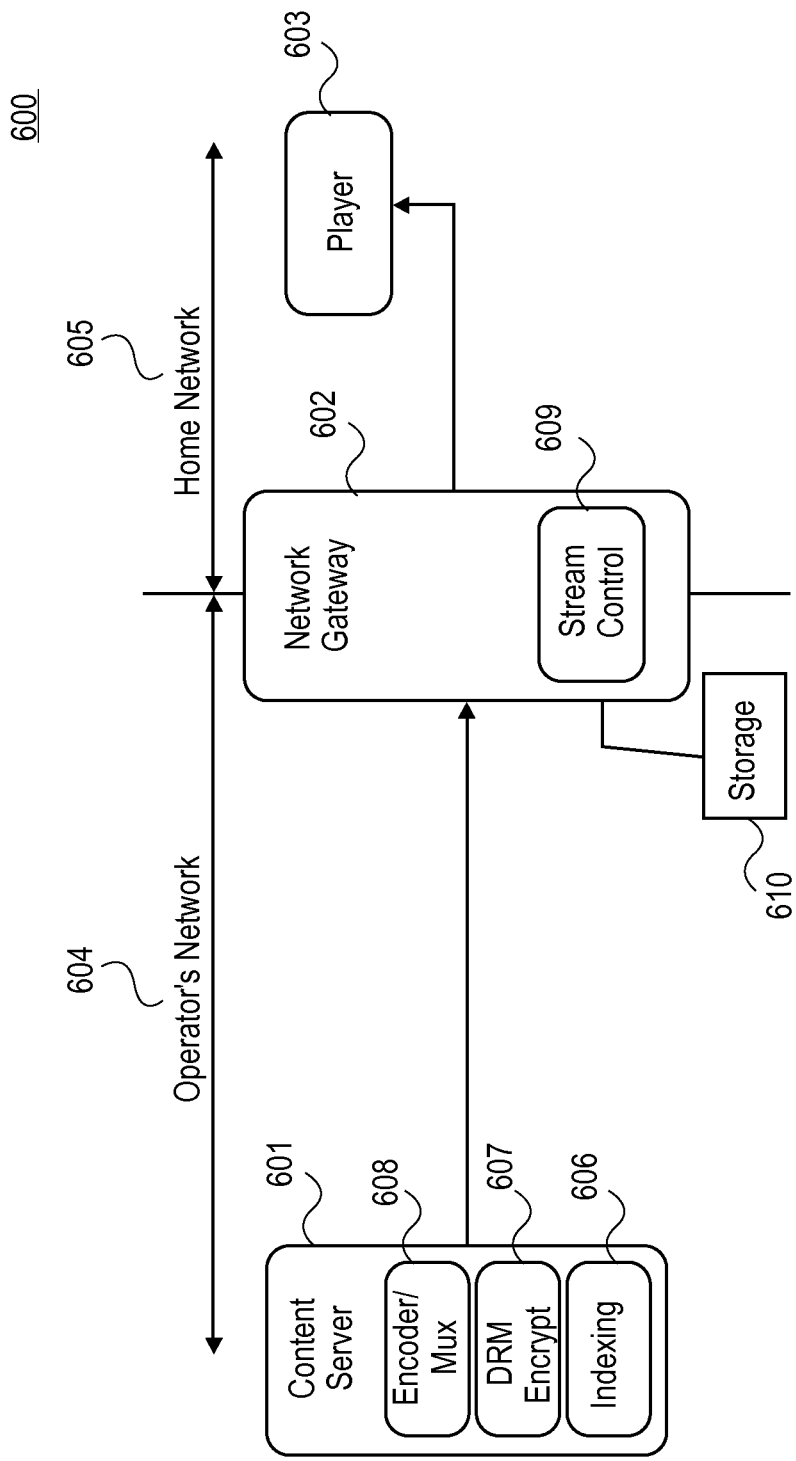
FIG. 6 shows a block diagram of an exemplary embodiment of a network for direct delivery of DRM-encrypted content.

FIG. 6 shows a block diagram of an exemplary embodiment of a network for DRM encrypted content delivery. A network 600 includes an operator's network 604 and a home network 605. The operator's network 600 includes a content server 601. Content server 601 has an encoder/multiplexer ("Encoder/Mux") 608 a DRM encrypter 607, and an indexing logic 606. Home network 603 includes one or more players, e.g., a player 603. As shown in FIG. 6, the premium content is delivered to a gateway 602. Gateway 602 includes a stream control logic 609. As shown in FIG. 6, storage 610 can be coupled and/or incorporated into the gateway 602. In at least some embodiments, content server 601 is configured to perform content indexing (e.g., identify random access points in the incoming multimedia content stream).

As shown in FIG. 6, the premium content is directly DRM-encrypted in the operator's network for one or more players. The gateway 602 is not provisioned to access the content in the clear. In such a model, the Content Server 601 provide content with a format and a DRM protection suitable for the home players. The gateway implements the streaming control functions of the home network. The indexing function is performed in the operator's network (e.g., at content server 601). The indexing information is carried either in-band (along the premium content) or out-of-band (separated from the premium content) from content server 601 to the gateway 602.

Figure 7:
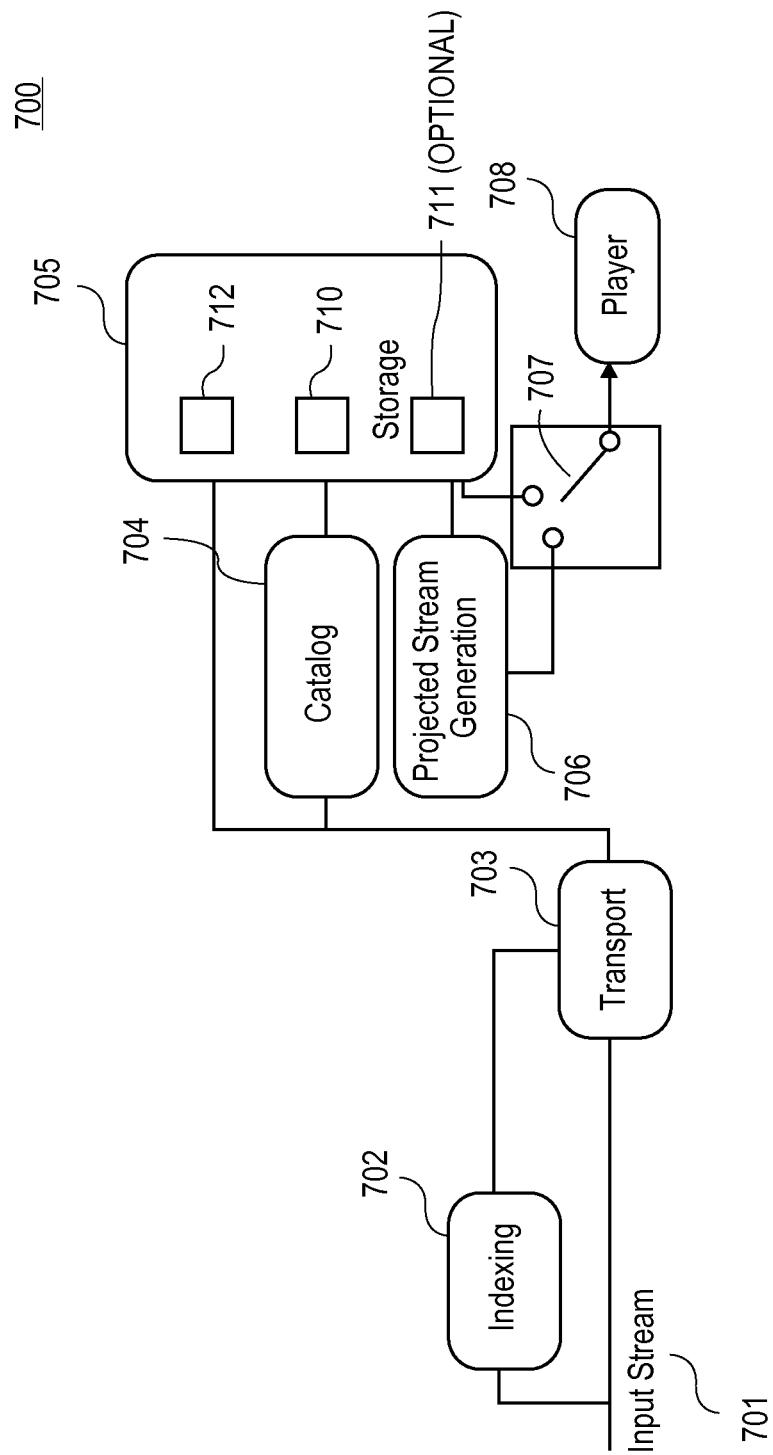
FIG. 7 shows a block diagram of an exemplary embodiment of an apparatus to project trick mode operations.

FIG. 7 shows a block diagram of an exemplary embodiment of an apparatus (e.g., a gateway) to project trick mode operations. The trick mode operations may be, for example, pause, jump, slow motion and scan. An apparatus 700 includes an indexing logic 702 coupled to an input stream 701, a transport logic 703, a catalog logic 704, a projected content stream ("scan") generation logic 706, a storage 705, and a player 708. In at least some embodiments, the indexing logic 702 is configured to determine the start and end position of anchor frames in the input stream 701. This information is used by the catalog logic 704 to generate the information necessary for generating the projected scan stream.

In at least some embodiments, the indexing logic 702 is configured to parse the decrypted incoming stream 701 in its original container form. The indexing logic 702 can be configured to detect the anchor frame positions and sizes (in particular the start and end of the anchor frame) and to generate metadata information.

In at least some embodiments, the transport logic 703 is configured to carry indexing information to a gateway, when indexing is performed by a network. More specifically, the transport logic 703 can be configured to multiplex the indexing information with the input stream 701 to deliver over the operators' network to the gateway or to provide the indexing information over the operators' network out-of-band upon request. Transport logic 703 can be configured to provide the input stream 701 having unaltered original multimedia content to storage 705. In at least some embodiments, transport logic 703 is optional and may not be needed when indexing is performed by the gateway. For example, input stream 701 having unaltered original multimedia content and the indexing information created in the gateway can be provided directly to storage 705 without transport logic 703. In at least some embodiments, the catalog logic 704 is configured to store indexing information in the gateway. More specifically, the catalog logic 704 can be configured to create the catalog information that can be stored locally in storage 705, for example, in a file 710 or on the home Network-Attached Storage (NAS) (not shown). One or more anchor frames of the input stream can be optionally stored in locally in the gateway. For example, a file 711 containing one or more anchor frames can be optionally created in storage 705. In at least some embodiments, the projected scan stream generation logic 706 is configured to create a projected scan stream in the gateway. More specifically, the projected scan stream generation logic 706 can be configured to generate a projected scan stream based on the catalog information generated from the original input stream 701. In at least some embodiments, the projected scan stream is generated based on indexing information stored in file 710 and the original content stored in file 712. In at least some embodiments, the projected scan stream is generated based on indexing information stored in file 710 and the one or more anchor frames stored in file 711.

In at least some embodiments, pause and slow motion trick modes are performed at a player device 708. A switch block 707 can switch player 708 to projected scan stream generation logic 706 or the unaltered original multimedia content buffered in 705 based, for example, on the speed required to access the multimedia content. In at least some embodiments, unaltered original multimedia content is buffered in the gateway along with the file containing the indexing information and file containing the one or more anchor frames. As shown in FIG. 7, file 712 containing the unaltered original multimedia content of the input stream 701, file 710 containing indexing information and file 711 containing one or more anchor frames are stored in storage 705.

The pause and slow motion trick modes typically do not increase the traffic in the network and do not require decimation of the multimedia content. In at least some embodiments, pause trick mode is performed in a gateway, in the client, or both. In at least some embodiments, the slow motion trick mode is performed in a client, in a gateway, or both.

In at least some embodiments, the projected PVR scan method set forth herein is video codec- and file format-agnostic. For example, the projected PVR scan method can work with Video codecs, such as VC-1/H.264/MPEG-2, multiplexes and containers, such as ASF/MP4/MPEG2 TS, and streaming protocols, such as HTTP Live Streaming protocol, IIS Smooth Streaming protocol, HTTP Dynamic Streaming protocol, or any other streaming protocol.

Figure 8:
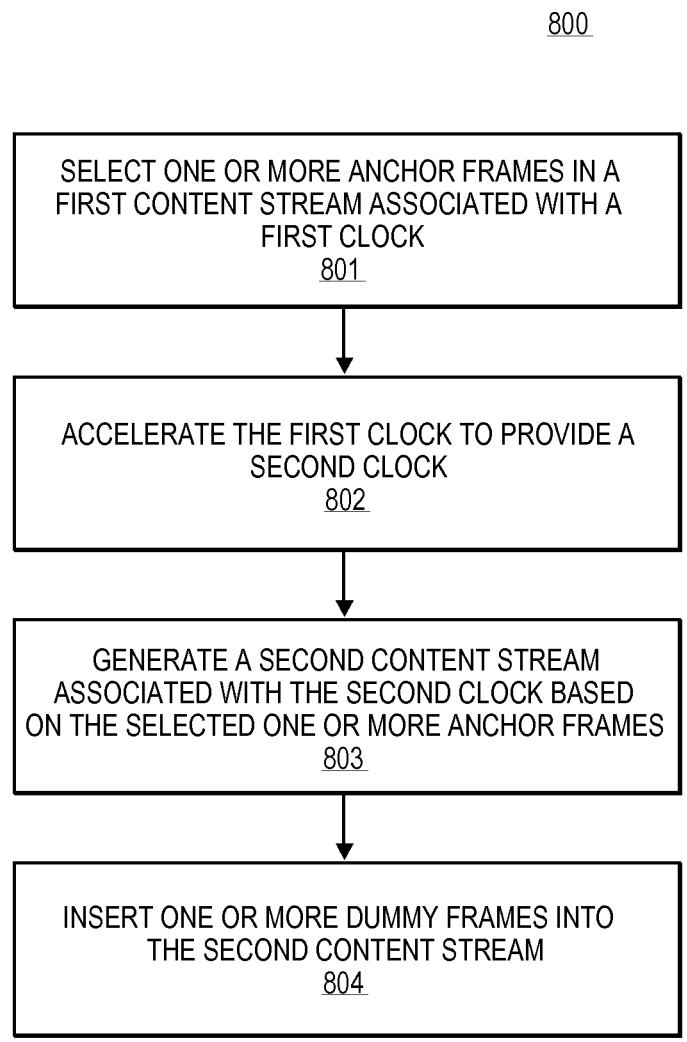
FIG. 8 is a flowchart of an exemplary embodiment of a method to generate a projected scan stream.

FIG. 8 is a flowchart of an exemplary embodiment of a method to generate a projected scan stream. Method 800 begins with operation 801 involving selecting one or more anchor frames in a first content stream associated with a first reference clock. In at least some embodiments, the one or more anchor frames are selected from the first content stream based on the desired bit rate of the content stream, the encryption key associated with the anchor frame, or on both, as set forth in further detail below.

In at least some embodiments, the reference clock is used to synchronize the multimedia content in the original incoming stream. The frames in the content stream may have respective timestamps relative to the reference clock. In at least some embodiments, the one or more anchor frames are detected in the first content stream, and indexing information associated with the anchor frames is generated and stored, as set forth above. In at least some embodiments, the first content stream is decrypted, so that the anchor frames can be found to generate the indexing information. In at least some embodiments, indexing information associated the one or more anchor frames is received from a network, as set forth above. In at least some embodiments, the first content stream is encrypted.

At operation 802 the first reference clock is accelerated to provide a second reference clock. The clock can be used to know which anchor frame from the first content stream to select, as set in further detail below. In at least some embodiments, the second reference clock is used to synchronize the multimedia content in the projected scan stream having a trick mode. At operation 803, a second (e.g., projected scan) content stream is generated that is associated with the second clock based on the selected one or more anchor frames. In at least some embodiments, the anchor frames are selected from the first content stream based on the second reference clock.

In at least some embodiments, the second content stream is generated based on the selected one or more anchor frames without decrypting the encrypted anchor frames in the first content stream. At operation 804 one or more dummy frames are inserted into the second content stream between at least a portion of the selected anchor frames. For example, the one or more dummy frames can be inserted into the second stream based on the second reference clock, channel fullness, or both, as set forth in further detail below. In at least some embodiments, the first content stream, the second content stream, or both are in compliance with a Hypertext Transfer Protocol ("HTTP") Live Streaming protocol, IIS Smooth Streaming protocol, HTTP Dynamic Streaming protocol, or any other streaming protocol.

Figure 9:
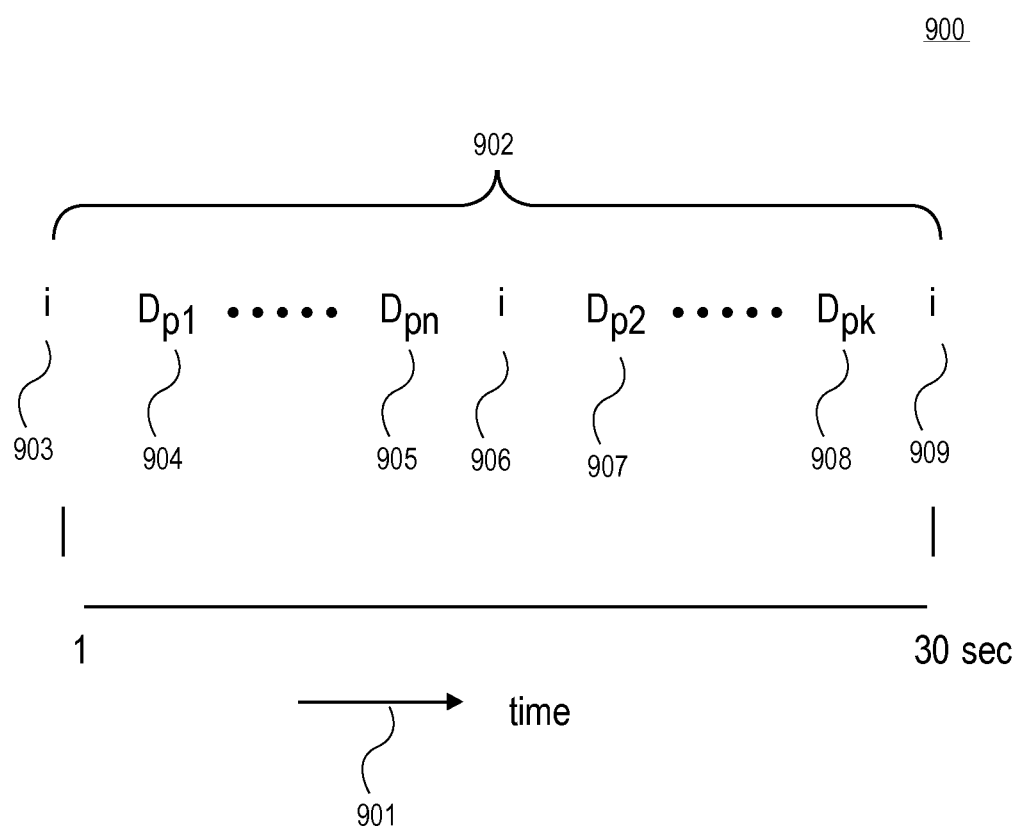
FIG. 9 illustrates one embodiment of generating a projected scan stream based on anchor frames of an incoming content stream.

FIG. 9 illustrates one embodiment of generating a projected scan stream 900 based on anchor frames of an incoming content stream. As shown in FIG. 9, a projected scan stream 900 against time 901 includes a sequence of anchor frames 903, 906, and 909 (e.g., I-frames or IDR pictures) selected from the anchor frames of an incoming original multimedia content stream. Typically, when the frame rate of the video stream is about 30 frames per second, an anchor frame may appear in the video stream about every 15 frames or half a second.

Typically, the size of an anchor frame (e.g., I-frame or IDR picture) is bigger than the size of other frames (e.g., predicted pictures such as P or B frames or slices) in a video sequence. Greater the number of anchor frames in the sequence, greater the bit rate it creates. In at least some embodiments, some anchor frames in the incoming original content stream are discarded and replaced with Dummy-P frames to adjust the bit rate of the projected scan stream to the incoming content stream.

Removing all the frames between the anchor frames in the original frame sequence produces a video sequence at 15× motion for the typical example of one anchor frame ever 15 frames. Replacing all the frames between the anchor frames in the original frame sequence with dummy frames produces a slide show at 1× motion of the original content stream. In at least some embodiments, the number of dummy frames inserted between the anchor frames is controlled by a desired speed of the scan mode. That is, a projected scan multimedia content stream having any speed of the scan mode can be generated by selecting one or more anchor frames while (optionally) discarding other anchor frames from the original content stream, and (optionally) inserting the dummy frames between at least some selected anchor frames.

As shown in FIG. 9, dummy frames 904, 905, 907, and 908 (e.g., Dummy-P frames ("$D_{p1} \ldots D_{pn}$") are inserted between anchor frames 903, 906, and 909. Typically, a Dummy-P frame is a small frame that only reconstructs a previous reference frame without any difference. The Dummy-P frame inserted between the anchor frames can be adapted to the size of the anchor frame and to the frame rate required by the player to render the projected scan stream at a nominal 1×. In at least some embodiments, anchor frames are selected from an incoming original content stream based on a desired speed of a trick mode, and an average bit rate of the original content stream, so there is no impact of a projected scan mode on a network, as described in further detail below. In at least some embodiments, an amount of dummy-P frames inserted between the anchor frames in the projected scan stream is determined based on a desired speed of a trick mode, encryption key changes, and an average bit rate of the original content stream, so there is no impact of a projected scan mode on a network, as described in further detail below.

Referring back to FIG. 7, in at least some embodiments, as the projected scan stream generation logic 706 generates a stream based on pre-encrypted anchor frames, both the catalog logic 704 and the generation logic 706 are configured to extract the encrypted anchor frames from the original input stream 701. In at least some embodiments, extracting the encrypted anchor frames from the original input stream requires, that the anchor frame is at the beginning of any encrypted Multiplex Access Unit ("MAU"), but can be anywhere within an in-the-clear MAU, and that the anchor frame, with all its corresponding headers, is terminated with padding, if the anchor frame is fully encrypted, as shown in FIG. 10, or with the beginning of the next encoded frame, as shown in FIG. 11.

Generally, a Multiplex Access Unit refers to the smallest number of bytes defined by the transport layer that carries a portion of an elementary stream (for example, 188 bytes in MPEG-2 Transport Stream or "Chunk" in a MPEG-4 file container). A collection of Multiplex Access Units provides a video "Segment" of a predefined finite amount of time (its size), as defined by the streaming protocols (for example the playlist item in HTTP live streaming protocol).

Figure 10:
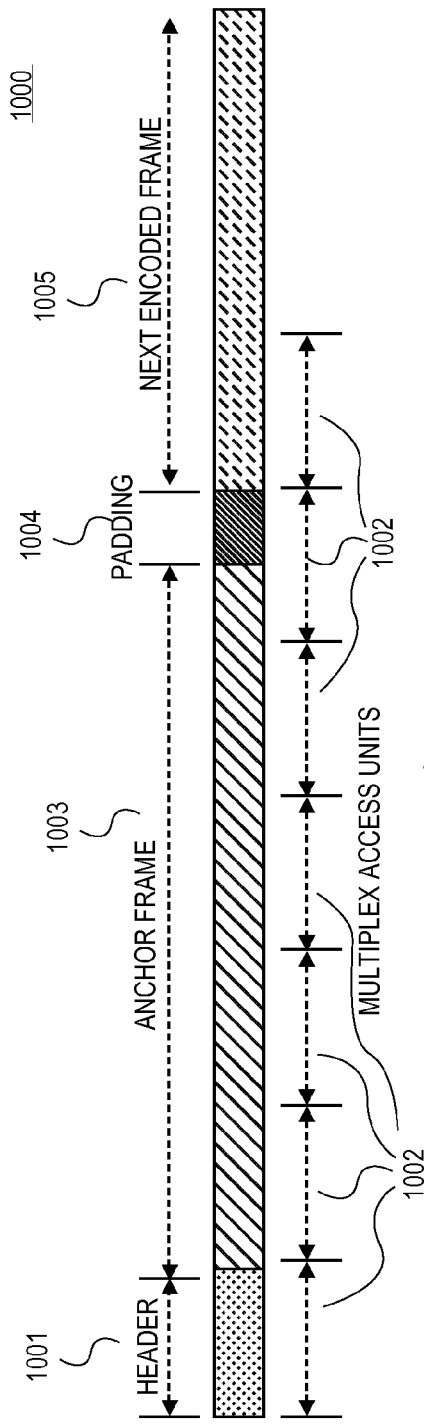
FIG. 10 illustrates one embodiment of an anchor frame padding for multiplex access unit alignment.

FIG. 10 illustrates one embodiment of an anchor frame padding for multiplex access unit alignment 1000. As shown in FIG. 10, an anchor frame 1003 with a header 1001 is at the beginning of any encrypted MAU, such as MAU 1002. As shown in FIG. 10, anchor frame 1003 is terminated with a padding 1004. For example, a video encoder can be aware of the intended multiplexing and is capable to apply the appropriate padding, such as padding 1004 in between an anchor frame 1003 and a next anchor frame 1005 in the encoded stream. As shown in FIG. 10, anchor frame 1003 is terminated with padding 1004 and the next encoded frame 1005 starts on a MAU boundary.

Figure 11:
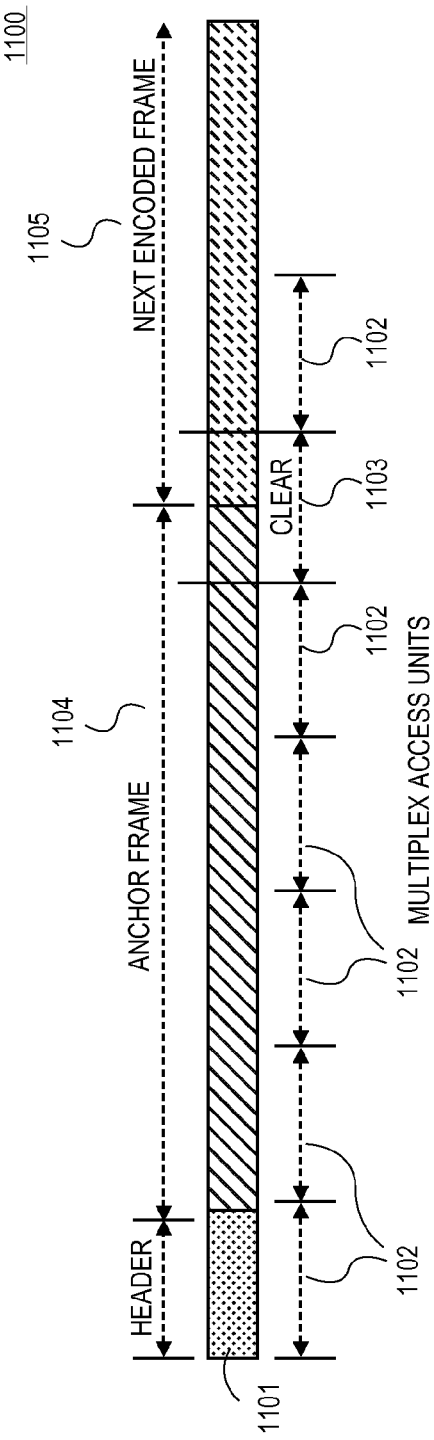
FIG. 11 illustrates one embodiment of an anchor frame partial encryption of the last Multiplex Access Unit.

FIG. 11 illustrates one embodiment of an anchor frame partial encryption of the last Multiplex Access Unit. As shown in FIG. 11, an anchor frame 1104 with a header 1101 is carried over multiple encrypted MAU, such as MAU 1102. As shown in FIG. 11, anchor frame 1104 is terminated with a beginning of a next encoded frame 1105. As shown in FIG. 11, the last MAU 1103 of the anchor frame 1104 is left in-the-clear, so that there is no padding restriction between the two encoded frames. In at least some embodiments, each MAU in the content stream can be either encrypted, or left in-the-clear. For example, when the encrypter is aware of the projected PVR multiplexing requirement and is capable of doing partial encryption.

Referring back to FIG. 7, a necessary amount of metadata is collected at the time of indexing for the projected scan stream generation logic 706, because the content may only be decrypted by the player. In at least some embodiments, the indexing information obtained at the indexing stage for each anchor frame includes start and end byte position of the anchor frame, original timestamp at the anchor frame, an average bit rate of the content segment the anchor frame belongs to, horizontal and vertical resolutions of the anchor frame, frame rate of the content segment the anchor frame belongs to, and a DRM key identifier. The DRM key identifier is used by the projected scan stream generation logic 706 to detect when the encryption key is changing. Because the projected scan stream generation logic 706 concatenates anchor frames potentially encrypted with the different key, the projected scan stream generation logic 706 monitors the key refresh method and content segments re-generation. The change of the encryption key is monitored, for example, to avoid having two anchor frames in the projected scan stream encrypted with two different keys, as there should be only one key used by content segment. If the key is about to change, a decision needs to be made to properly terminate the current content segment and start a new one on key change boundary, as set forth in further detail below with respect to FIG. 16. Information about whether the encryption key changes can be obtained from the indexing information.

Transport logic 703 delivers the indexing and metadata information to the catalog logic 704. The indexing and metadata information can be delivered in-band multiplexed with the content or out-of-band upon request. In at least some embodiments, for the in-band delivery, the indexing information is collected, packetized in a Multiplex Access Unit, and inserted in the original multiplex, typically in front of the anchor frame.

Figure 12:
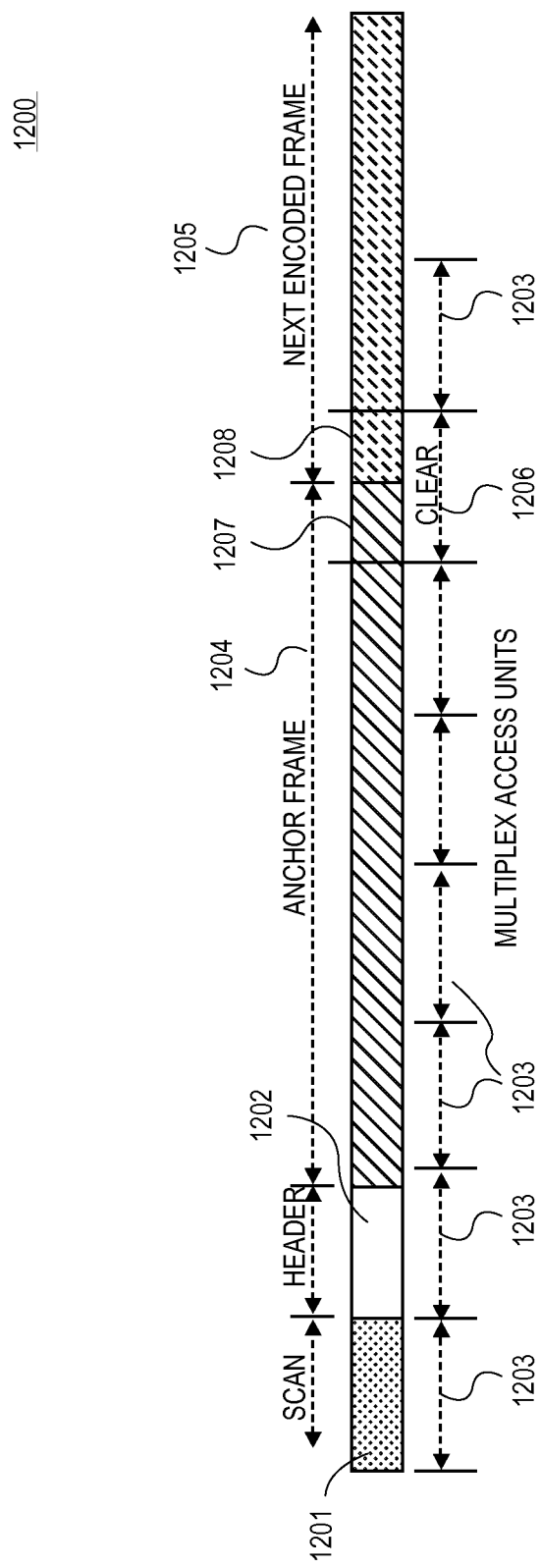
FIG. 12 illustrates one embodiment of a scan indexing information inserted in a content stream.

FIG. 12 illustrates one embodiment of indexing information inserted in a content stream 1200. As shown in FIG. 12, content stream 1200 contains MAUs, such as a MAU 1203.

Content stream 1200 has a scan index access unit 1201 that includes indexing information. As shown in FIG. 12, scan index access unit 1201 is inserted in front of an anchor frame 1204 with a header 1202 at the beginning of an encrypted MAU, such as MAU 1203. As shown in FIG. 12, anchor frame 1204 is terminated with a beginning of a next encoded frame 1205. As shown in FIG. 12, a last MAU 1206 of the anchor frame 1204 including portion 1207 and portion 1208 of next encoded frame 1205 is left in-the-clear. In at least some embodiments, the indexing information is collected and added to the descriptors of the content segment (e.g., in the playlist file of the HTTP Live streaming protocol).

Referring back to FIG. 7, the transport logic 703 can be configured to segment-based request the indexing information of each content segment. As an example, the indexing information of a content segment in a HTTP live streaming playlist are shown below:

```
#EXTM3U
#    COPYRIGHT © 2009 DIGITAL KEYSTONE - MAELSTROM
     STREAMING PLAYLIST
#EXT-X-TARGETDURATION:1
#EXT-X-MEDIA-SEQUENCE:108
#EXT-X-ALLOW-CACHE:NO
#    MAESLSTROM INFO: Channel 31 LiveIndex 109 GenIndex 110
#    MAELSTROM Scan: SEG108, H 1920, V 1080, FPS 59.94, KCTR 101
#    MAELSTROM Scan: START 0x0, END 0x10000, PTS 0x100
#    MAELSTROM Scan: START 0x20000, END 0x30000, PTS 0x16090
.../...
#EXTINF: 1, Segment108.ts
HTTP:<PrimaryLocation>/Inst0Ch31Seg108.ts
#    MAELSTROM Scan: SEG109, H 1920, V 1080, FPS 59.94, KCTR 101
#    MAELSTROM Scan: START 0x0, END 0x10000, PTS 0x100
#    MAELSTROM Scan: START 0x30000, END 0x40000, PTS 0x16090
.../...
#EXTINF: 1, Segment109.ts
HTTP:<PrimaryLocation>/Inst0Ch31Seg109.ts
#    MAELSTROM Scan: SEG110, H 1920, V 1080, FPS 59.94, KCTR 102
#    MAELSTROM Scan: START 0x0, END 0x10000, PTS 0x100
#    MAELSTROM Scan: START 0x20000, END 0x30000, PTS 0x16090
#EXTINF: 1, Segment110.ts
HTTP:<PrimaryLocation>/r.Seg110.ts
```

The catalog logic 704 can be configured to parse the incoming stream for retrieving indexing information inserted by the transport logic 703. In at least some embodiments, the catalog logic 704 extracts the indexing data and the Multiplex Access Units of the anchor frame to create an index catalog file (for example: .dkx), containing the indexing information and a frame catalog file (example: .dkc), containing the anchor frames.

The index catalog file is needed for the projected scan stream generation logic 706 as it holds the required information to perform the projected scan stream generation. In at least some embodiments, the index catalog file is separated from the frame catalog file.

The frame catalog file is an optional intermediate component that makes the projected scan stream generation logic 706 more efficient. If the frame catalog file is not generated by the catalog logic 704, the projected scan stream generation logic 706 needs to demultiplex the anchor frames from the buffered content input stream at playback time.

In at least some embodiments, the projected scan stream generation logic 706 is configured to create a bitstream based on the original content's anchor frames in response to a scan mode request from the client application and to stream the created bitstream through the IP network following the same streaming protocol as the original content. The customized projected scan bitstream creates an impression of fast motion by placing anchor frames at time intervals computed based on the desired speed. In at least some embodiments, the time interval between anchor frames is filled with specially crafted frames (e.g., dummy-P frames) to create a legitimate stream for the player 708.

In at least some embodiments, projected scan stream generation logic 706 computes the insertion rate of dummy-P frames based on the desired speed effect, as well as on the desired bit rate. In the case of segment-based streaming protocols, the projected scan stream generation logic 706 also creates segments of similar duration as the ones used for the original content.

Figure 13:
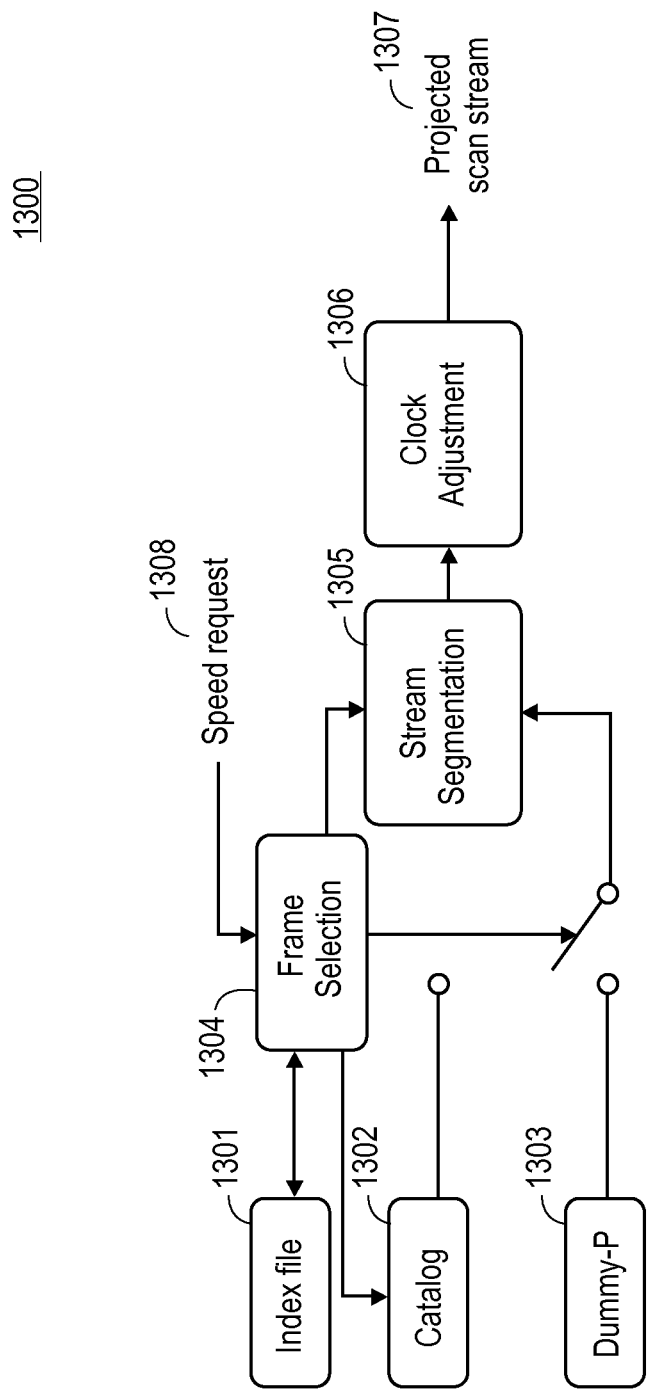
FIG. 13 shows a block diagram of an exemplary embodiment of an apparatus to generate a projected scan stream.

FIG. 13 shows a block diagram of an exemplary embodiment of an apparatus 1300 to generate a projected scan stream. Apparatus 1300 includes a frame selection and insertion decision logic 1304 coupled to an index file 1301, a catalog 1302, a dummy frame generation logic ("Dummy-P") 1303, a stream segmentation logic 1305. Frame selection logic 1304 is configured to select frames from the original content stream in response to a speed request 1308. As shown in FIG. 13, stream segmentation logic 1305 is coupled to clock adjustment logic 1306 to output a projected scan stream 1307. In at least some embodiments, stream segmentation logic 1305 is configured to generate content segments based on encryption key change, as set forth in further detail below. Clock adjustment logic 1306 can be configured to adjust presentation time of the projected scan stream 1307.

Figure 14:
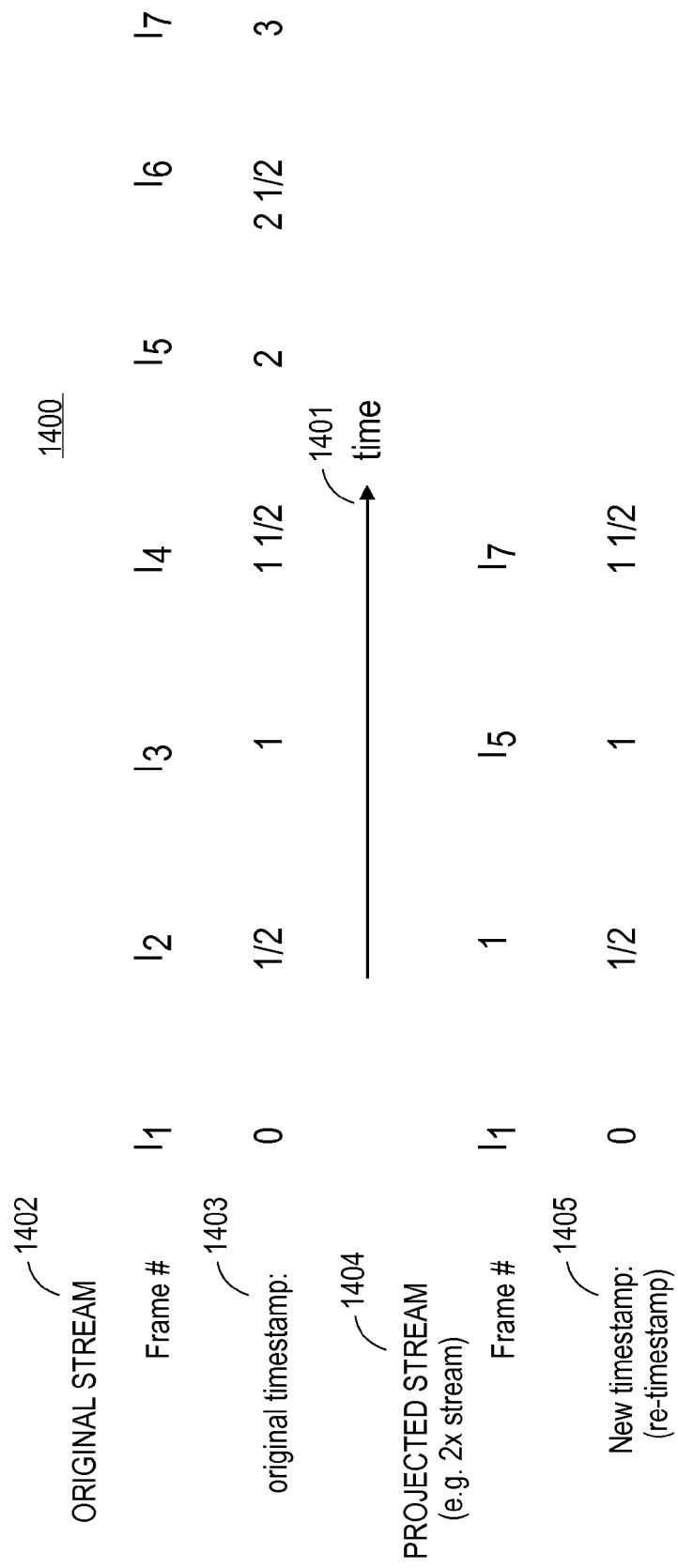
FIG. 14 shows one exemplary embodiment of adjusting presentation time of a projected scan stream.

FIG. 14 shows one exemplary embodiment of adjusting presentation time of a projected scan stream 1400. As shown in FIG. 14, original stream 1402 contains anchor frames $I_1$-$I_7$. Each of the frames in the original stream 1402 has an original presentation time ("timestamp") 1403. For example, frame $I_1$ has original timestamp 0, frame $I_2$ has original timestamp $\frac{1}{2}$, frame $I_3$ has original timestamp 1, frame $I_4$ has original timestamp $1^{1/2}$, frame $I_5$ has original timestamp 2, frame $I_6$ has original timestamp $2^{1/2}$, and frame $I_7$ has original timestamp 3. A projected scan stream 1404 (e.g., 2× stream) generated from original stream 1402 has anchor $I_1$, $I_5$, and $I_7$ selected from the original stream 1402, and a dummy-P frame $D_1$ inserted between anchor frames $I_1$ and $I_5$ based at least on the desired speed of the scan mode (e.g., 2×) to maintain the average bit rate of the projected scan stream matched to the average bit rate of the original stream. As shown in FIG. 14, timestamps for the frames $I_1$, $D_1$, $I_5$, and $I_7$ in the projected scan stream 1404 are adjusted. For example, the timestamps for the frames $I_1$, $D_1$, $I_5$, and $I_7$ in the projected scan stream are adjusted to new timestamps 0, $\frac{1}{2}$, 1, and $1^{1/2}$ respectively. The timestamps of the frames $I_1$, $D_1$, $I_5$, and $I_7$ of the projected scan stream 1404 are adjusted to render the projected scan stream 1404 synchronized to a new clock that runs at 1× speed at a player.

Referring back to FIG. 13, in at least some embodiments, frame selection and insertion decision logic 1304 is configured to determine which anchor frame to select from an original content stream, and how many Dummy-P frames to insert. Clock adjustment logic 1306 can be configured to adjust the frame presentation time to ensure it matches the frame rate of the original content.

In at least some embodiments, apparatus 1300 operates in a continuous loop, and stops when reaching the end of the file, or through user interaction. It is possible to change the current projected scan speed without restarting the projected scan stream generation process.

Figure 15:
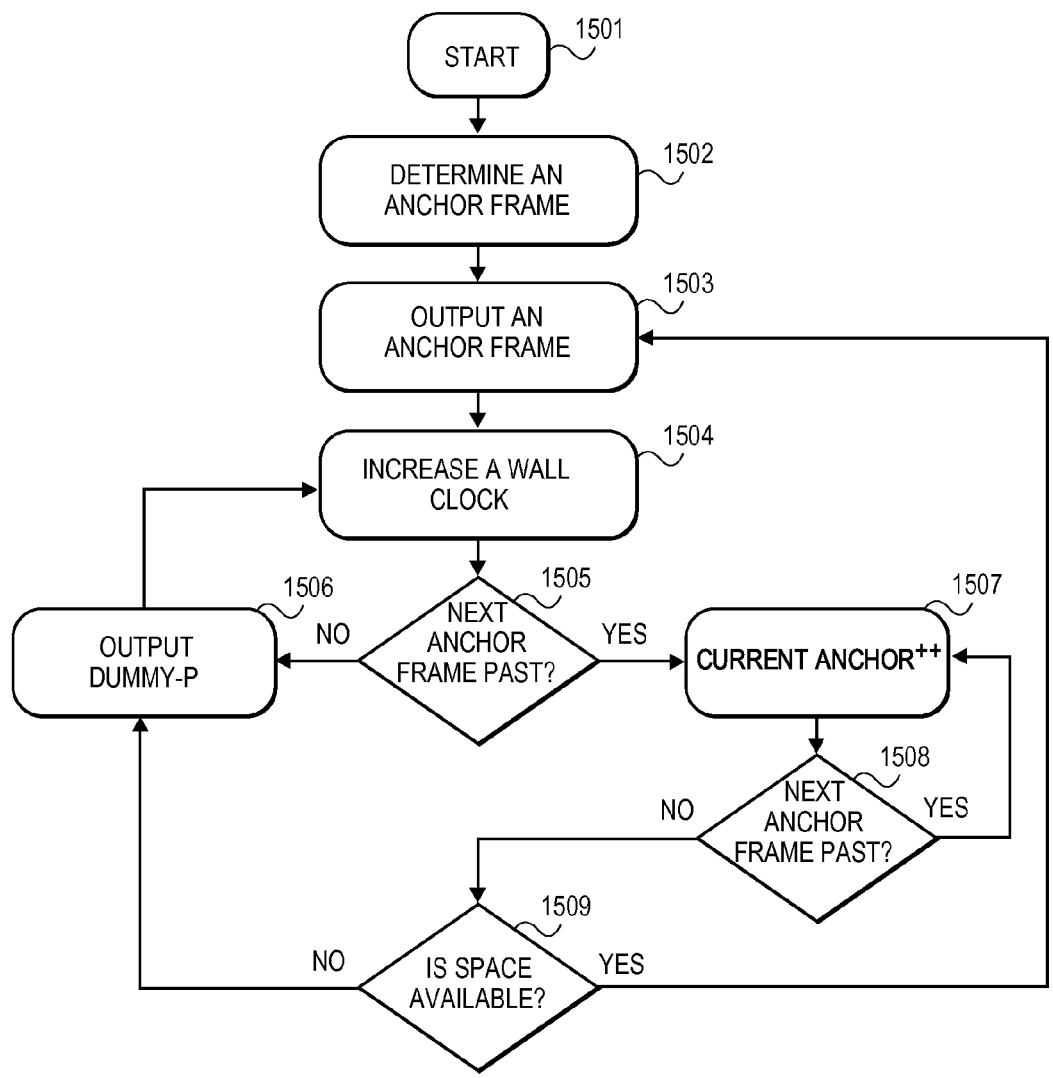
FIG. 15 is a flowchart of an exemplary embodiment of a method to select and insert frames to generate a projected scan stream.

FIG. 15 is a flowchart of an exemplary embodiment of a method 1500 to select and insert frames to generate a projected scan stream. Method starts at 1501. At operation 1502 a first anchor frame is determined. Determining the first anchor frame includes computing which anchor frame from an incoming original content stream to display first in the projected scan stream. That frame is typically the next anchor frame from the current continuous playback position (at normal or slow speed, even paused) in the chosen scanning direction (e.g., next anchor frame for a forward scanning direction, a previous anchor frame for a backward scanning direction). The determination of the current position can be done by knowing the buffer status of the player, by retrieving the timestamp of the displayed picture (preferably), or by any of the aforementioned mechanisms that is supported by the player.

Method 1500 continues with operation 1503 involving outputting a current anchor frame. In at least some embodiments, outputting the current anchor frame includes identifying the current anchor frame by the anchor frame index, adjusting the presentation timestamp and clock references of the anchor frame based on the internal clock values ("Wall Clock"), and updating the channel bit rate usage monitoring based on the size of current anchor frame. That is, when a normal playback is switched to a fast forward, a position of the first anchor frame can be determined based on the current playback, and then selecting the anchor frames from the incoming content stream begins. The anchor frames can be selected from the incoming content stream based on the speed of the trick mode and on the average bit rate to render the projected scan stream at a nominal 1× speed at a player.

At operation 1504 the Wall Clock is increased from a first clock value to a second clock value. In at least some embodiments, the Wall Clock can be a real time clock that provides time, for example time of day, in hours, minutes, seconds, or other measurements of time. In at least some embodiments, a presentation timestamp of the outputted current anchor frame is adjusted based on the second clock value. In at least some embodiments, the Wall Clock is increased at the frame rate of the current media segment. The Wall Clock is used as a reference clock to generate the proper timing of the projected scan stream. Every Wall Clock increment, the insertion logic maintains an internal channel fullness measure as well as the current size of the content segment being generated, as follows:

Channel_fullness+=(AverageBit rate/Frame-per-second)−Size(OutputPicture);

Segment+=1/Frame-per-second.

Operation 1505 involves determining whether a next anchor frame still needs to be inserted based on the second clock value ("Next Anchor Frame Past?"). This tests if the frame is in the past. In at least some embodiments, the next anchor frame is identified by indexing information associated with an incoming content stream. In at least some embodiments, determining whether the next anchor frame identified by the anchor frame index needs to be inserted is performed based on the second clock value.

If it is determined that the next anchor frame does not need to be inserted, then at operation 1506 one or more Dummy-P frames are generated and outputted ("Output Dummy-P"). The next anchor frame does not need to be inserted, for example, when operation 1505 occurs earlier than one frame interval away from the right presentation time for the next anchor frame. In at least some embodiments, outputting one or more dummy-P frames includes outputting a bit pattern using the current anchor frame horizontal and vertical size information, outputting the internal second clock values for presentation time stamp and clock reference, and updating the channel bit rate usage based on the Dummy-P bit pattern size.

If it is determined that the next anchor frame can be inserted (e.g., because it is still fresh and valid), at operation 1507 the anchor frame pointer is increased ("Current Anchor++"). In at least some embodiments, updating indexing information involves updating an anchor frame index to the latest anchor frame that has a presentation time, modulated at the current scan speed and direction, behind the second clock value. At operation 1508 it is determined if a next anchor frame identified by the anchor frame index needs to be inserted or not based on the second clock value (e.g., "Next Anchor Past?").

If it is determined that the next anchor frame needs to be inserted, method 1500 returns to operation 1507. If it is determined that the next anchor frame does not need to be inserted, operation 1509 involving determination whether a space is available to output the next anchor frame ("Is Space Available? Test") is performed.

In at least some embodiments, monitoring accumulation of the bits in the output channel is performed to make sure that a bit rate of the generated projected scan stream matches in average the bit rate of the original incoming content stream.

In at least some embodiments, the next anchor frame does not need to be inserted if, for example, the test occurs earlier than one frame interval away from the right presentation time for the next anchor frame.

In at least some embodiments, determining whether space is available to output the next anchor frame includes verifying if there is space available in the output channel to output the selected anchor frame. In at least some embodiments, for example, when generating segment-based streaming, it is also determined if a new content segment needs to be started on the selected anchor frame. In at least some embodiments, a new content segment associated with the next encryption key is created based on the second clock, as set forth in further detail below.

In at least some embodiments, monitoring the current bit rate of the generated stream with the average bit rate of the original stream, as well as the size of output content segments (segment-based streaming) is performed. The space monitoring can be done by accumulating the bits output every second clock increment and comparing with the original's content average bit rate of the corresponding content segment (computed while generating the indexing information). The output content segment size monitoring also aligns key transition on output content segment boundaries and ensures each segment is within predefined limits, for example a +/−50% of the selected content segment size. The minimum and maximum limits can be fully independent, and do not need to be a function of the selected content segment size.

If the space in the output channel is available to output the next anchor frame, method 1500 returns to operation 1503, as described above. If the space is not available to output the next anchor frame, one or more dummy-P frames are outputted at operation 1506, as described above.

Figure 16:
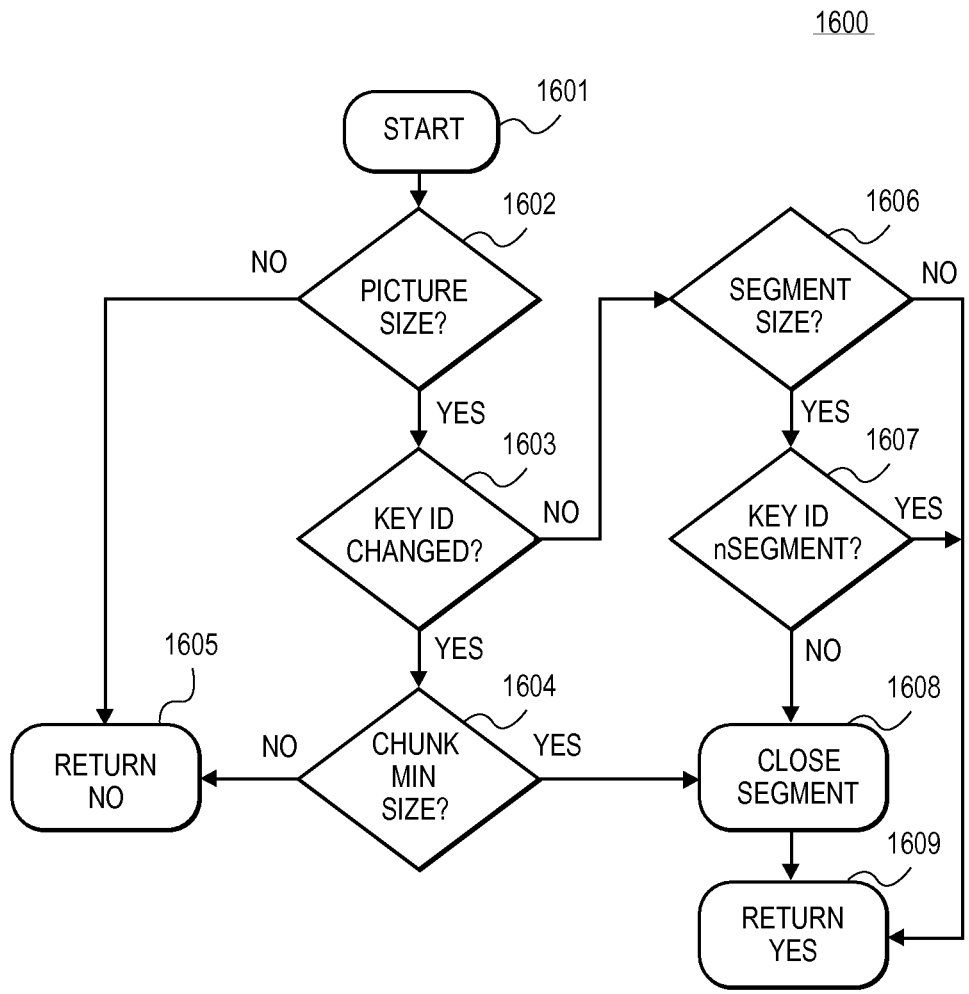
FIG. 16 is a flowchart of an exemplary embodiment of a method to determine whether a space is available to output an anchor frame with a segment-based streaming protocol.

FIG. 16 is a flowchart of an exemplary embodiment of a method to determine whether a space is available to output an anchor frame with a segment-based streaming protocol. Method 1600 starts at operation 1601. At operation 1601 a "Picture Size?" test is performed that includes comparing the size of a selected anchor frame with the available channel fullness as follows:

Size(Selected Anchor Frame)>Channel_fullness ?

If the size of the selected anchor frame is not greater than the available channel fullness, "No" is returned at operation 1605. If the size of the selected anchor frame is greater than the available channel fullness, operation 1603 ("KeyID changed?") that includes determining if the key identification ("KeyID") of the selected anchor frame changes from the previously selected anchor frame. If the KeyID of the selected anchor frame does not change, operation 1606 ("Segment Min Size?") is performed that involves determining if the current content segment has reached the minimum size defined by the segment-based streaming protocol, as follows:

SegmentSize>=SEGMENT_SIZE (for example, SEGMENT_SIZE=1 sec).

If it is determined at operation 1603 that the KeyID of the selected anchor frame changes, a new segment needs to be created. In at least some embodiments, if the KeyID changes, operation 1604 ("Segment Min Size?") is performed that involves determining whether the size of the current segment is greater than a minimum segment size. In at least some embodiments, operation 1604 involves verifying that the size of the generated segment is greater than a predetermined minimum size. For example, it can be verified that the size of the generated segment is greater than a minimum boundary value: for example 50% of the predefined content segment size:

SegmentSize>=MIN_SEGMENT_SIZE (for example 50% of SEGMENT SIZE)

If the segment size is not greater than a predetermined minimum segment size, "No" is returned at operation 1605. If the segment size is greater than a predetermined minimum segment size, the current content segment closes and the SegmentSize internal parameter is reset at operation 1608.

Referring back to operation 1606, if it is determined that the current content segment has not reached the size defined by the segment-based streaming protocol, "Yes" is returned at operation 1609. If the current content segment has reached the size defined by the segment-based streaming protocol, operation 1607 ("KeyID nSegment?") optionally can be performed. In at least some embodiments, operation 1607 involves determining if a key change is occurring in the near future of the current anchor frame, as follows:

KeyID(AnchorFrame[current])!=KeyID(AnchorFrame[current+{MAX_SEGMENT_SIZE-SEGMENT_SIZE}])

for example:
MAX_SEGMENT_SIZE=SEGMENT_SIZE+50%

If the key change is occurring in the near future of the current anchor frame, operation 1608 ("CloseSegment") is performed. Operation 1608 involves closing the current content segment, resetting the SegmentSize internal parameter. At operation 1609 "Yes" is returned. For example, if the key change is arriving in less than a predetermined percent (e.g., 15%-50%) of the size of the current segment, the current segment is extended by inserting dummy frames. If the key change is arriving in more than a predetermined percent (e.g., 15%-50%) of the size of the current segment, a new segment can be created.

In at least some embodiments, upon each new trick mode request, the current player presentation status is determined. The more accurate the status is, the better the user experience. The current player presentation status can be determined by querying the player (if supported) or by interpolation, for example, Using UPnP APIs such as CurrentDecodePTS.ochn.org HTTP optional header in the CableLabs Home Network specifications, or RelativeTimePosition UPnP AV Transport descriptor, or by reading or estimating the current player buffer size.

Figure 17:
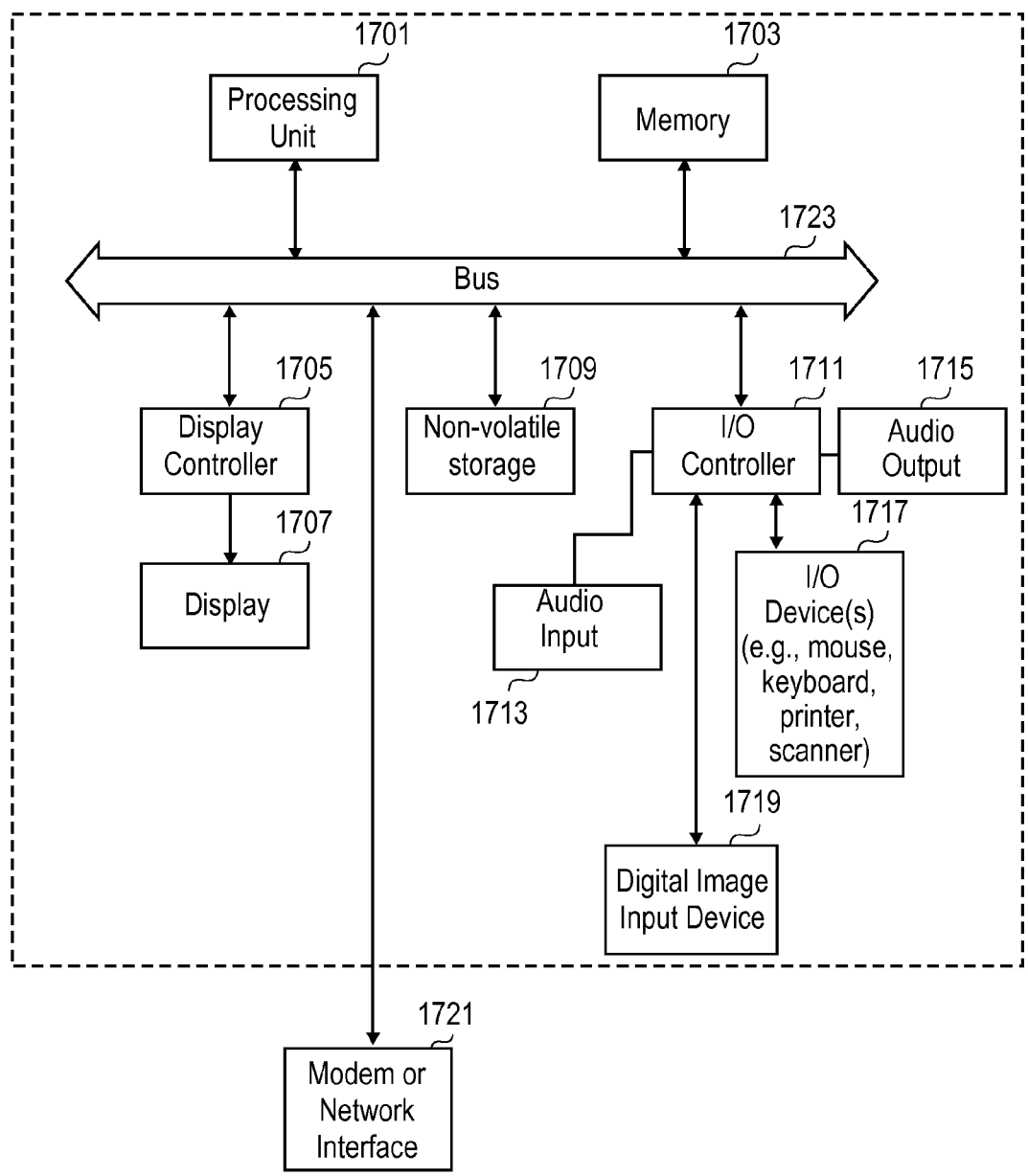
FIG. 17 shows a block diagram of one embodiment of a data processing system to project trick mode operations.

FIG. 17 shows a block diagram of one embodiment of a data processing system to project trick mode operations. Data processing system 1700 includes a processing unit 1701 that may include a microprocessor or microprocessor, such as Intel microprocessor (e.g., Core i7, Core 2 Duo, Core 2 Quad, Atom), Sun Microsystems microprocessor (e.g., SPARC), IBM microprocessor (e.g., IBM 750), Motorola microprocessor (e.g., Motorola 68000), Advanced Micro Devices ("AMD") microprocessor, Texas Instrument microcontroller, and any other microprocessor or microcontroller.

Processing unit 1701 may include a personal computer (PC), such as a Macintosh® (from Apple Inc. of Cupertino, Calif.), Windows®-based PC (from Microsoft Corporation of Redmond, Wash.), or one of a wide variety of hardware platforms that run the UNIX operating system or other operating systems. In at least some embodiments, processing unit 1701 includes a general purpose or specific purpose data processing system based on Intel, AMD, Motorola, IBM, Sun Microsystems, IBM processor families, or any other processor families. As shown in FIG. 17, memory 1703 is coupled to the processing unit 1701 by a bus 1723.

Memory 1703 can be dynamic random access memory (DRAM) and can also include static random access memory (SRAM). A bus 1723 couples processing unit 1701 to the memory 1703 and also to non-volatile storage 1709 and to display controller 1705 (if a display is used) and to the input/output (I/O) controller(s) 1711. Display controller 1705 controls in the conventional manner a display on a display device 1707 which can be a cathode ray tube (CRT), liquid crystal display (LCD), or any other display device. The input/output devices 1717 can include a keyboard, disk drives, printers, a scanner, a camera, and other input and output devices, including a mouse or other pointing device. The I/O controller 1711 is coupled to one or more audio input devices 1713, for example, one or more microphones.

The display controller 1705 and the I/O controller 1711 can be implemented with conventional well known technology. An audio output 1715, for example, one or more speakers may be coupled to an I/O controller 1711. The non-volatile storage 1709 is often a magnetic hard disk, an optical disk, or another form of storage for large amounts of data. Some of this data is often written, by a direct memory access process, into memory 1703 during execution of software in the data processing system 1700 to perform methods described herein.

One of skill in the art will immediately recognize that the terms "computer-readable medium" and "machine-readable medium" include any type of storage device that is accessible by the processing unit 1701. A data processing system 1700 can interface to external systems through a modem or network interface 1721. It will be appreciated that the modem or network interface 1721 can be considered to be part of the data processing system 1700. This interface 1721 can be an analog modem, ISDN modem, cable modem, token ring interface, satellite transmission interface, or other interfaces for coupling a data processing system to other data processing systems.

It will be appreciated that data processing system 1700 is one example of many possible data processing systems which have different architectures. For example, personal computers based on an Intel microprocessor often have multiple buses, one of which can be an input/output (I/O) bus for the peripherals and one that directly connects the processing unit 1701 and the memory 1703 (often referred to as a memory bus). The buses are connected together through bridge components that perform any necessary translation due to differing bus protocols.

Network computers are another type of data processing system that can be used with the embodiments of the present invention. Network computers do not usually include a hard disk or other mass storage, and the executable programs are loaded from a network connection into the memory 1703 for execution by the processing unit 1701. A typical data processing system will usually include at least a processor, memory, and a bus coupling the memory to the processor.

It will also be appreciated that the data processing system 1700 can be controlled by operating system software which includes a file management system, such as a disk operating system, which is part of the operating system software. Operating system software can be the family of operating systems known as Macintosh® Operating System (Mac OS®) or Mac OS X® from Apple Inc. of Cupertino, Calif., or the family of operating systems known as Windows® from Microsoft Corporation of Redmond, Wash., and their associated file management systems. The file management system is typically stored in the non-volatile storage 1709 and causes the processing unit 1701 to execute the various acts required by the operating system to input and output data and to store data in memory, including storing files on the non-volatile storage 1709.

In various embodiments, hardwired circuitry may be used in combination with software instructions to implement methods described herein. A machine readable medium can be used to store software and data which when executed by a data processing system causes the system to perform various methods described herein. This executable software and data may be stored in various places including for example ROM, volatile RAM, non-volatile memory, and/or cache. Portions of this software and/or data may be stored in any one of these storage devices.

Thus, a machine readable medium includes any mechanism that provides (i.e., stores and/or transmits) information in a form accessible by a machine (e.g., a computer, network device, or any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 1700 of FIG. 17.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:
1. A method, comprising:
  receiving a first content stream at a first speed by a gateway having a first network interface connected to a first network and a second network interface connected to a second network, wherein the first content stream is received over the first network;
  receiving by the gateway a request to access the first content stream at a second speed over the second network;

monitoring by the gateway an encryption key change in the first content stream;
generating by the gateway a second content stream based on the second speed and the monitoring, wherein the second content stream is transmitted over the second network to be rendered at the first speed by a client device; and
sending the second content stream over the second network interface, wherein the second content stream has a timing information compatible with the first speed, and wherein the first content stream is encrypted, and the second content stream is generated without decrypting the encrypted first content stream.

2. The method of claim 1, wherein the generating the second content stream includes determining anchor frames from the first content stream.

3. The method of claim 1, wherein the generating the second content stream includes inserting one or more dummy-P frames between at least a portion of the anchor frames.

4. The method of claim 3, wherein an amount of the dummy-P frames inserted between at least a portion of the anchor frames is determined based on the second speed, the encryption key change, and an average bit rage of the first content stream.

5. The method of claim 1, further comprising:
detecting anchor frames in the first content stream;
generating indexing information associated with the anchor frames; and
storing the indexing information.

6. The method of claim 1, further comprising:
receiving indexing information associated with the first content stream over the first network interface.

7. The method of claim 1, further comprising:
decrypting the first content stream before generating the second content stream.

8. The method of claim 1, wherein at least one of the first content stream and the second content stream is in compliance with a Hypertext Transfer Protocol ("HTTP") Live Streaming protocol, IIS Smooth Streaming protocol, HTTP Dynamic Streaming protocol, or any other streaming protocol, and wherein the second content stream is generated by at least in part creating content segments having a duration that is similar to the duration of a content segment for the first content stream.

9. The method of claim 1, wherein the second content stream is not generated, if the second speed is less or equal to the first speed, and the first content stream is transmitted over the second network interface.

10. The method of claim 1, wherein the generating the second content stream further includes creating a content segment associated with an encryption key based on the second speed.

11. A non-transitory machine-readable medium storing executable program instructions which when executed by a data processing system cause the system to perform operations, comprising:
receiving a first content stream at a first speed by a gateway having a first network interface connected to a first network and a second network interface connected to a second network, wherein the first content stream is received over the first network;
receiving by the gateway a request to access the first content stream at a second speed over the second network;
monitoring by the gateway an encryption key change in the first content stream;
generating by the gateway a second content stream based on the second speed and the monitoring, wherein the second content stream is transmitted over the second network to be rendered at the first speed by a client device; and
sending the second content stream over the second network interface, wherein the second content stream has a timing information compatible with the first speed, and wherein the first content stream is encrypted, and the second content stream is generated without decrypting the encrypted first content stream.

12. The non-transitory machine-readable medium of claim 11, wherein the generating the second content stream includes determining anchor frames from the first content stream.

13. The non-transitory machine-readable medium of claim 11, wherein the generating the second content stream includes inserting one or more dummy P frames between at least a portion of the anchor frames.

14. The non-transitory machine-readable medium of claim 13, wherein an amount of dummy P frames inserted between at least a portion of the anchor frames is determined based on the second speed, the encryption key change, and an average bit rage of the first content stream.

15. The non-transitory machine-readable medium of claim 11, further comprising instructions that cause the system to perform operations comprising:
detecting anchor frames in the first content stream;
generating indexing information associated with the anchor frames; and
storing the indexing information.

16. The non-transitory machine-readable medium of claim 11, further comprising instructions that cause the system to perform operations comprising:
receiving indexing information associated with the first content stream over the first network interface.

17. The non-transitory machine-readable medium of claim 11, further comprising instructions that cause the system to perform operations comprising:
decrypting the first content stream before generating the second content stream.

18. The non-transitory machine-readable medium of claim 11, wherein at least one of the first content stream and the second content stream is in compliance with a Hypertext Transfer Protocol ("HTTP") Live Streaming protocol, IIS Smooth Streaming protocol, HTTP Dynamic Streaming protocol, or any other streaming protocol, and wherein the second content stream is generated by at least in part creating content segments having a duration that is similar to the duration of a content segment for the first content stream.

19. The non-transitory machine-readable medium of claim 11, wherein the second content stream is not generated, if the second speed is less or equal to the first speed, and the first content stream is transmitted over the second network interface.

20. The non-transitory machine-readable medium of claim 11, wherein the generation of the second content stream further includes creating a content segment associated with an encryption key based on the second speed.

21. A data processing system, comprising:
a memory;
a processor coupled to the memory;
a first network interface coupled to the processor and connected to a first network, and a second network interface coupled to the processor and connected to a second network, wherein the processor configured to receive a first content stream at a first speed over the first network;

the processor configured to monitor an encryption key change in the first content stream, to receive a request to access the first content stream at a second speed over the second network;

to generate a second content stream based on the second speed and the monitoring, wherein the second content stream is transmitted over the second network to be rendered at the first speed by a client device; and to send the second content stream over the second network interface, wherein the second content stream has a timing information compatible with the first speed, and wherein the first content stream is encrypted, and the second content stream is generated without decrypting the encrypted first content stream.

22. The system of claim 21, wherein the generating the second content stream includes determining anchor frames from the first content stream.

23. The system of claim 21, wherein the generating the second content stream includes inserting one or more dummy P frames between at least a portion of the anchor frames.

24. The system of claim 23, wherein an amount of dummy P frames inserted between at least a portion of the anchor frames is determined based on the second speed, the encryption key change, and an average bit rage of the first content stream.

25. The system of claim 21, wherein the processor is further configured to detect anchor frames in the first content stream; to generate indexing information associated with the anchor frames; and to store the indexing information.

26. The system of claim 21, wherein the processor is further configured to receive indexing information associated with the first content stream over the first network interface.

27. The system of claim 21, wherein the processor is further configured to decrypt the first content stream before generating the second content stream.

28. The system of claim 21, wherein at least one of the first content stream and the second content stream is in compliance with a Hypertext Transfer Protocol ("HTTP") Live Streaming protocol, IIS Smooth Streaming protocol, HTTP Dynamic Streaming protocol, or any other streaming protocol, and wherein the second content stream is generated by at least in part creating content segments having a duration that is similar to the duration of a content segment for the first content stream.

29. The system of claim 21, wherein the second content stream is not generated, if the second speed is less or equal to the first speed, and the first content stream is sent over the second network interface.

30. The system of claim 21, wherein the generating the second content stream further includes creating a content segment associated with an encryption key based on the second speed.

31. A data processing system, comprising:

a first network interface connected to a first network and a second network interface connected to a second network;

means for receiving a first content stream at a first speed over the first network;

means for receiving a request to access the first content stream at a second speed over the second network;

means for monitoring an encryption key change in the first content stream;

means for generating a second content stream based on the second speed and the monitoring, wherein the second content stream is transmitted over the second network to be rendered at the first speed by a client device; and means for sending the second content stream over the second network interface, wherein the second content stream has a timing information compatible with the first speed, and wherein the first content stream is encrypted, and the second content stream is generated without decrypting the encrypted first content stream.

* * * * *